United States Patent
Kawamura

(10) Patent No.: US 9,568,716 B2
(45) Date of Patent: Feb. 14, 2017

(54) ZOOM LENS AND IMAGING APPARATUS

(71) Applicant: FUJIFILM Corporation, Tokyo (JP)

(72) Inventor: Daiki Kawamura, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 50 days.

(21) Appl. No.: 14/645,435

(22) Filed: Mar. 12, 2015

(65) Prior Publication Data
US 2015/0185448 A1 Jul. 2, 2015

Related U.S. Application Data

(63) Continuation of application No. PCT/JP2013/005293, filed on Sep. 6, 2013.

(30) Foreign Application Priority Data

Sep. 14, 2012 (JP) .................... 2012-202352

(51) Int. Cl.
*G02B 9/60* (2006.01)
*G02B 15/163* (2006.01)
(Continued)

(52) U.S. Cl.
CPC ............ *G02B 15/163* (2013.01); *G02B 15/16* (2013.01); *G02B 15/173* (2013.01); *G02B 27/646* (2013.01)

(58) Field of Classification Search
CPC ..... G02B 15/163; G02B 15/173; G02B 15/16; G02B 27/646; G02B 9/60; G02B 13/0045
See application file for complete search history.

(56) References Cited

U.S. PATENT DOCUMENTS

2008/0212206 A1 9/2008 Hatada
2009/0323198 A1 12/2009 Kusaka
(Continued)

FOREIGN PATENT DOCUMENTS

JP 2008-216440 9/2008
JP 2009-251280 10/2009
(Continued)

OTHER PUBLICATIONS

JP Office Action, dated May 19, 2015; Application No. 2014-535367.
(Continued)

*Primary Examiner* — Joseph P Martinez
(74) *Attorney, Agent, or Firm* — Young & Thompson

(57) ABSTRACT

A zoom lens consists of a first lens group having positive refractive power, a second lens group having negative refractive power, a third lens group having positive refractive power, a fourth lens group having negative refractive power, and a fifth lens group having positive refractive power in this order from an object side. Distances between the lens groups change during magnification change, and the first lens group is positioned closer to the object side in a telephoto end state than its position in a wide angle end state. Further, the first lens group consists of three lenses of an 11th lens having negative refractive power, a 12th lens having positive refractive power and a 13th lens having positive refractive power in this order from the object side. Further, the following conditional expressions are satisfied:

$$1.75 < Nd11 \qquad (1);$$

$$28 < vd11 < 44 \qquad (2);$$

$$63 < vd12 \qquad (3); \text{ and}$$

$$0.020 < |f2|/ft < 0.050 \qquad (4).$$

20 Claims, 16 Drawing Sheets

(51) Int. Cl.
  *G02B 15/173* (2006.01)
  *G02B 15/16* (2006.01)
  *G02B 27/64* (2006.01)

(56) References Cited

U.S. PATENT DOCUMENTS

| | | |
|---|---|---|
| 2011/0019033 A1 | 1/2011 | Ori et al. |
| 2011/0032625 A1 | 2/2011 | Saito |
| 2011/0141577 A1 | 6/2011 | Kimura |
| 2012/0044388 A1 | 2/2012 | Ito |
| 2012/0188647 A1 | 7/2012 | Tanaka et al. |
| 2013/0208364 A1* | 8/2013 | Ito .......................... G02B 15/14 359/690 |
| 2013/0242169 A1 | 9/2013 | Okubo |
| 2013/0279018 A1 | 10/2013 | Koreeda et al. |
| 2014/0313399 A1 | 10/2014 | Okubo |
| 2014/0313592 A1 | 10/2014 | Ito |

FOREIGN PATENT DOCUMENTS

| | | |
|---|---|---|
| JP | 2009-294513 | 12/2009 |
| JP | 2011-123337 | 6/2011 |
| JP | 2011-186417 | 9/2011 |
| JP | 2012-042807 | 3/2012 |
| JP | 2012-155087 | 8/2012 |
| JP | 2013-164455 | 8/2013 |
| JP | 2013-178298 | 9/2013 |
| JP | 2013-190741 | 9/2013 |
| JP | 2013-224979 | 10/2013 |

OTHER PUBLICATIONS

International Search Report PCT/JP2013/005293 dated Dec. 17, 2013.

* cited by examiner

EXAMPLE 1

A
WIDE ANGLE END

B
MIDDLE

C
TELEPHOTO END

EXAMPLE 2

A
WIDE ANGLE END

B
MIDDLE

C
TELEPHOTO END

EXAMPLE 3

A WIDE ANGLE END

B MIDDLE

C TELEPHOTO END

EXAMPLE 4

A
WIDE ANGLE END

B
MIDDLE

C
TELEPHOTO END

EXAMPLE 5

A
WIDE ANGLE END

B
MIDDLE

C
TELEPHOTO END

EXAMPLE 6

A
WIDE ANGLE END

B
MIDDLE

C
TELEPHOTO END

EXAMPLE 7

A
WIDE ANGLE END

B
MIDDLE

C
TELEPHOTO END

EXAMPLE 1

EXAMPLE 2

EXAMPLE 3

EXAMPLE 5

EXAMPLE 6

EXAMPLE 7

ZOOM LENS AND IMAGING APPARATUS

CROSS-REFERENCE TO RELATED APPLICATIONS

This application is a Continuation of PCT International Application No. PCT/JP2013/005293 filed on Sep. 6, 2013, which claims priority under 35 U.S.C. §119(a) to Japanese Patent Application No. 2012-202352 filed on Sep. 14, 2012. Each of the above applications is hereby expressly incorporated by reference, in its entirety, into the present application.

BACKGROUND OF THE INVENTION

Field of the Invention

The present invention relates to a zoom lens and an imaging apparatus. In particular, the present invention relates to a zoom lens used in an electronic camera, such as a digital camera, a camera for broadcasting, a camera for surveillance and a camera for film making, and also to an imaging apparatus including the zoom lens.

Description of the Related Art

In zoom lenses used in imaging apparatuses, such as a video camera and an electronic still camera using imaging devices, such as a CCD (Charge Coupled Device) and a CMOS (Complementary Metal Oxide Semiconductor), as recording media, a request for higher variable magnification ratios is increasing. As types of zoom lenses achieving high variable magnification ratios, a four-group-type zoom lens in which a positive group, a negative group, a positive group and a positive group are arranged in this order from the object side, or in which a positive group, a negative group, a positive group and a negative group are arranged in this order from the object side, or the like and a five-group-type zoom lens in which a positive group, a negative group, a positive group, a positive group and a positive group are arranged in this order from the object side, or in which a positive group, a negative group, a positive group, a negative group and a positive group are arranged in this order from the object side, or the like are known (for example, Japanese Unexamined Patent Publication No. 2011-186417 (Patent Document 1), Japanese Unexamined Patent Publication No. 2011-123337 (Patent Document 2), Japanese Unexamined Patent Publication No. 2009-294513 (Patent Document 3), and Japanese Unexamined Patent Publication No. 2009-251280 (Patent Document 4)).

SUMMARY OF THE INVENTION

Patent Document 1 discloses zoom lenses having variable magnification ratios of 28 in Examples 8 through 11. Patent Document 2 discloses zoom lenses having variable magnification ratios of 20 through 30. Patent Document 3 discloses zoom lenses having variable magnification ratios of 25 through 30.

One of major problems to be addressed in zoom lenses having high variable magnification ratios is balancing an optical performance, especially, chromatic aberrations at a telephoto side and the size of the lens system.

In the zoom lenses disclosed in Patent Document 1, aberrations are very excellently corrected. However, the extension amount of lens groups (the optical total length at a telephoto end) is rather large with respect to a focal length at a telephoto end. Therefore, when the variable magnification ratio is further increased while the zoom lens has the aforementioned configuration and arrangement of refractive power, the size of the zoom lens becomes extremely large. When the variable magnification ratio is increased, the size of a camera on which the lens is to be mounted should be increased so as to correspond to the increase in the variable magnification ratio. However, since the size of cameras demanded in markets is limited to some extent, it is not desirable that the size of the cameras simply increases in proportion to the increase in the variable magnification ratio.

Preventing the size of a lens system from becoming large even if a variable magnification ratio is increased is the same as reducing the size of the system without sacrificing its optical performance, such as chromatic aberrations at the telephoto side, in the example of Patent Document 1. For that purpose, there is room for improvement, for example, in selection of material used in the first lens group and the arrangement of refractive power in the first lens group. In four-group or five-group zoom lenses as described above, the first lens group generally consists of a cemented lens of a negative lens and a positive lens arranged closest to the object side, and one or two positive lenses.

In Patent Document 1, the first lens uses glass having an Abbe number of 25.4, and the second lens uses glass having an Abbe number of 64.2 or 70.2. For example, when the size of the system is tried to be reduced or a variable magnification ratio is tried to be increased while an increase in chromatic aberrations is suppressed in this configuration, the Abbe number of the material used in the second lens may be shifted further toward a low dispersion side, and correction may be performed by using anomalous dispersion properties. Generally, when a material having anomalous dispersion properties is used, the cost tends to increase. Therefore, although the cost must be taken into consideration, the material needs to be selected based on required specification and optical performance. After selection, the lens configuration and the arrangement of refractive power, especially, refractive power in the first lens group, the second lens group and the like need to be set in a most appropriate manner so that the size of the system does not become too large.

Further, when the Abbe number of a material used in a first lens that is a negative lens is set further toward a low dispersion side, that is advantageous to correction of a secondary spectrum. Patent Document 2 discloses an example in which a material having an Abbe number of 33.3 is used in the first lens. However, a variable magnification ratio remains at 29.9 times. Further, Patent Document 3 discloses an example in which anomalous dispersion glass having an Abbe number of 95.0 is used in the second lens. However, there is a problem that a production cost increases. A variable magnification ratio remains at 30 also in this example.

In Patent Document 4, variable magnification ratios of 39.6 times through 58.3 times are achieved by making the first lens group consist of four lenses. However, there is a problem that the size of the whole lens system becomes large. Further, the diameters of lenses arranged in the first lens group are overwhelmingly large, compared with those of lenses arranged in the other groups. Therefore, even if glass of expensive material is not used, a problem of increasing cost is big.

In view of the foregoing circumstances, it is an object of the present invention to provide a zoom lens in small size in which various aberrations are excellently corrected while the zoom lens has a high variable magnification ratio, and also an imaging apparatus including the zoom lens.

A zoom lens of the present invention consists of a first lens group having positive refractive power, a second lens group having negative refractive power, a third lens group having positive refractive power, a fourth lens group having negative refractive power, and a fifth lens group having positive refractive power in this order from an object side. Further, distances between the lens groups change during magnification change, and the first lens group is positioned closer to the object side in a telephoto end state than its position in a wide angle end state. Further, the first lens group consists of three lenses of an 11th lens having negative refractive power, a 12th lens having positive refractive power and a 13th lens having positive refractive power in this order from the object side. Further, the following conditional expressions are satisfied:

$1.75 < Nd11$ (1);

$28 < vd11 < 44$ (2);

$63 < vd12$ (3); and $0.020 < |f2|/ft < 0.050$ (4), where

Nd11: a refractive index of the 11-th lens for d-line,
vd11: an Abbe number of the 11-th lens for d-line,
vd12: an Abbe number of the 12-th lens for d-line,
f2: a focal length of the second lens group, and
ft: a focal length of an entire system at a telephoto end.

In the zoom lens of the present invention, it is desirable that the second lens group includes at least one positive lens, and that the following conditional expression is satisfied:

$15 < vd2p < 23$ (5), where vd2p: an Abbe number of the at least one positive lens in the second lens group for d-line.

Further, it is desirable that the following conditional expression is satisfied:

$50 < vd13 < 75$ (6), where vd13: an Abbe number of the 13th lens.

It is desirable that the third lens group includes at least one cemented lens including a positive lens, and that the following conditional expression is satisfied:

$65 < vd3pc$ (7), where vd3pc: an Abbe number of the positive lens constituting the at least one cemented lens for d-line.

Here, when plural positive lenses included in a cemented lens or lenses in the third lens group are present, as in a case that a cemented lens consisting of three or more lenses is present or a case that plural cemented lenses are present, at least one of the positive lenses included in the cemented lens or lenses in the third lens group should satisfy conditional expression (7).

Further, it is desirable that the following conditional expression is satisfied:

$8.5 < f1/|f2| < 16.0$ (8), where f1: a focal length of the first lens group.

Further, it is desirable that the following conditional expression is satisfied:

$0.3 < |f4|/(fw \times ft)1/2 < 1.4$ (9), where f4: a focal length of the fourth lens group, and
fw: a focal length of an entire system at a wide angle end.

Further, it is desirable that the following conditional expression is satisfied:

$0.3 < f5/|f4| < 1.5$ (10), where f5: a focal length of the fifth lens group, and
f4: a focal length of the fourth lens group.

Further, it is desirable that at least the first lens group, the second lens group, the third lens group and the fourth lens group move in such a manner that a distance between the first lens group and the second lens group increases, and a distance between the second lens group and the third lens group decreases, and a distance between the third lens group and the fourth lens group increases and a distance between the fourth lens group and the fifth lens group increases in the telephoto end state than their distances in the wide angle end state, respectively.

It is desirable that the second lens group consists of four lenses of a negative lens, a negative lens, and a cemented lens of a positive lens and a negative lens in this order from the object side.

Further, it is desirable that the third lens group includes at least two positive lenses and at least two negative lenses.

It is desirable that the fifth lens group consists of one lens.

Further, it is desirable that the fifth lens group is always fixed.

It is desirable that the fourth lens group consists of two lenses of a positive lens and a negative lens.

It is desirable that focusing is performed by moving the fourth lens group.

Further, it is desirable that the following conditional expressions are satisfied:

$1.78 < Nd11$ (1-1);

$29 < vd11 < 43$ (2-1);

$66 < vd12 < 85$ (3-1); and $0.023 < |f2|/ft < 0.050$ (4-1).

Further, it is more desirable that the following conditional expressions are satisfied:

$1.78 < Nd11$ (1-1);

$30 < vd11 < 42$ (2-2);

$66 < vd12 < 85$ (3-1); and $0.027 < |f2|/ft < 0.050$ (4-2).

Further, it is desirable that the second lens group includes at least one positive lens, and that the following conditional expression is satisfied:

$16 < vd2p < 22$ (5-1).

Further, it is desirable that the following conditional expression is satisfied:

$52 < vd13 < 72$ (6-1).

Further, it is desirable that the third lens group includes at least one cemented lens including a positive lens, and that the following conditional expression is satisfied:

$67 < vd3pc$ (7-1).

Further, it is more desirable that the following conditional expression is satisfied:

$80 < vd3pc$ (7-2).

Further, it is desirable that the following conditional expression is satisfied:

$9.0 < f1/|f2| < 15.0$ (8-1).

Further, it is more desirable that the following conditional expression is satisfied:

$10.0 < f1/|f2| < 14.0$ (8-2).

Further, it is desirable that the following conditional expression is satisfied:

$$0.4<|f4|/(fw \times ft)1/2<1.3 \quad (9\text{-}1).$$

Further, it is more desirable that the following conditional expression is satisfied:

$$0.5<|f4|/(fw \times ft)1/2<1.1 \quad (9\text{-}2).$$

Further, it is desirable that the following conditional expression is satisfied:

$$0.4<f5/|f4|<1.3 \quad (10\text{-}1).$$

Further, it is more desirable that the following conditional expression is satisfied:

$$0.5<f5/|f4|<1.2 \quad (10\text{-}2).$$

An imaging apparatus of the present invention includes the aforementioned zoom lens of the present invention.

The zoom lens of the present invention consists of a first lens group having positive refractive power, a second lens group having negative refractive power, a third lens group having positive refractive power, a fourth lens group having negative refractive power, and a fifth lens group having positive refractive power in this order from an object side. Further, distances between the lens groups change during magnification change, and the first lens group is positioned closer to the object side in a telephoto end state than its position in a wide angle end state. Further, the first lens group consists of three lenses of an 11th lens having negative refractive power, a 12th lens having positive refractive power and a 13th lens having positive refractive power in this order from the object side. Further, the following conditional expressions are satisfied. Therefore, it is possible to provide a zoom lens in small size in which various aberrations are excellently corrected while the zoom lens has a high variable magnification ratio.

$$1.75<Nd11 \quad (1);$$

$$28<vd11<44 \quad (2);$$

$$63<vd12 \quad (3); \text{ and}$$

$$0.020<|f2|/ft<0.050 \quad (4).$$

Further, the imaging apparatus of the present invention includes the zoom lens of the present invention. Therefore, it is possible to obtain high-image-quality video images at high variable magnification ratios, and to reduce the size of the apparatus.

DESCRIPTION OF THE PREFERRED EMBODIMENTS

Figure 1:
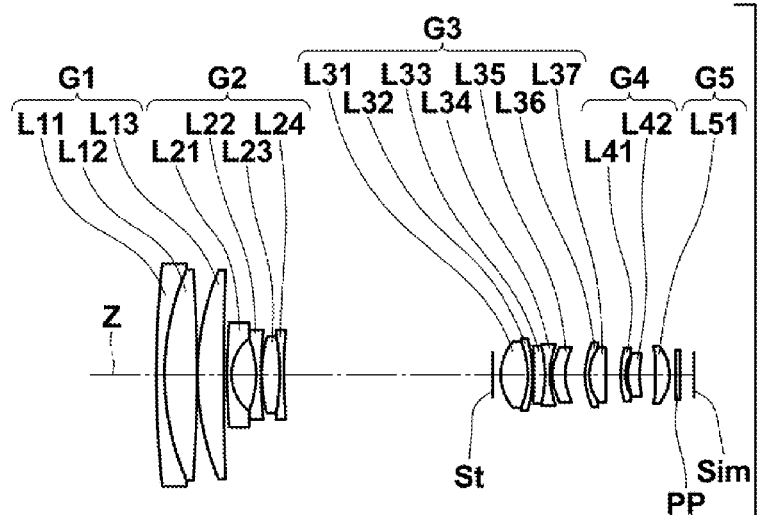
FIG. 1 is a cross section illustrating the lens configuration of a zoom lens according to an embodiment of the present invention (also Example 1)
Figure 1:
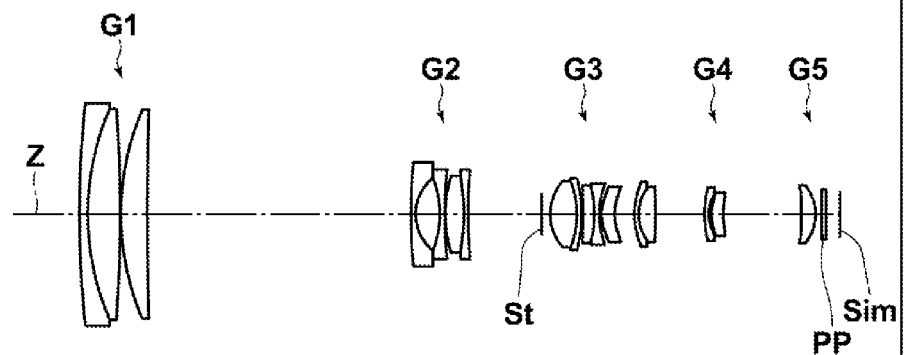
Figure 1:
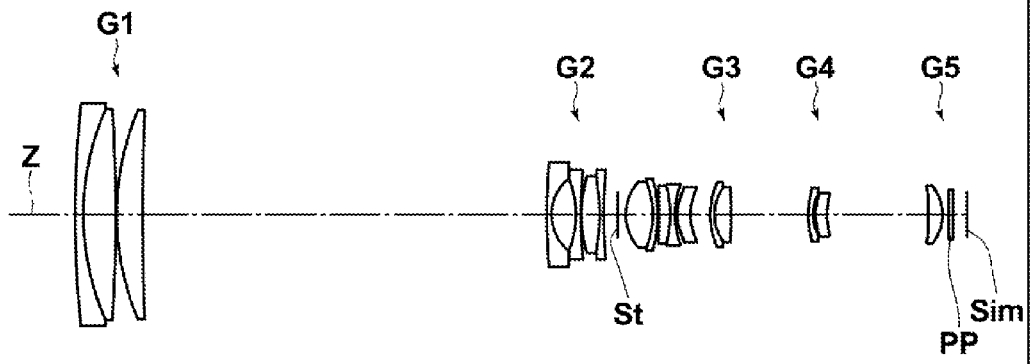
Figure 2:
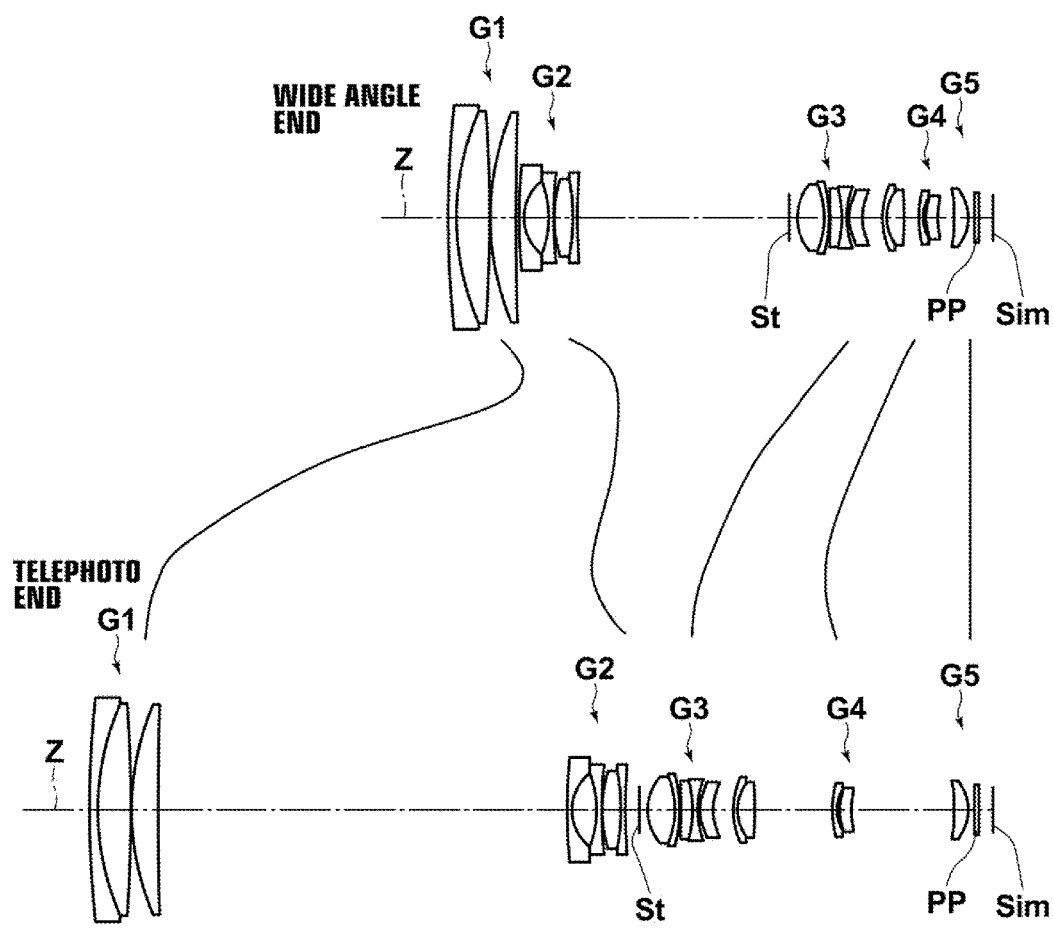
FIG. 2 is a cross section illustrating paths of movement of lens groups in the zoom lens.

Next, embodiments of the present invention will be described in detail with reference to drawings. FIG. 1 is a cross section illustrating the lens configuration of a zoom lens according to an embodiment of the present invention. FIG. 2 is a cross section illustrating paths of movement of lens groups in the zoom lens. The example of the configuration illustrated in FIGS. 1 and 2 is also the configuration of a zoom lens in Example 1, which will be described later. In FIGS. 1 and 2, a left side is an object side, and a right side is an image side.

This zoom lens consists of first lens group G1 having positive refractive power, second lens group G2 having negative refractive power, aperture stop St, third lens group G3 having positive refractive power, fourth lens group G4 having negative refractive power, and fifth lens group G5 having positive refractive power along optical axis Z in this order from an object side. Further, distances between the lens groups change during magnification change, and first lens group G1 is positioned closer to the object side in a telephoto end state than its position in a wide angle end state. Here, aperture stop St illustrated in FIGS. 1 and 2 does not necessarily represent the size nor the shape of the aperture stop, but the position of the aperture stop on optical axis Z.

When this zoom lens is applied to an imaging apparatus, it is desirable to arrange a cover glass, a prism, and various filters, such as an infrared-ray-cut filter and a low-pass filter, between an optical system and image plane Sim based on the configuration of a camera on which the lens is mounted. Therefore, FIGS. 1 and 2 illustrate an example in which parallel-flat-plate-shaped optical members PP, which is assumed to be these elements, is arranged between fifth lens group G5 and image plane Sim.

First lens group G1 consists of three lenses of 11th lens L11 having negative refractive power, 12th lens L12 having positive refractive power and 13th lens L13 having positive refractive power in this order from the object side.

For the purpose of obtaining a zoom lens having a high variable magnification ratio, and in which desirable optical performance, such as chromatic aberrations, and desirable size and cost are achieved in a well-balanced manner, it is necessary to set especially the material of a lens or lenses arranged in first lens group G1, the arrangement of refractive power in first lens group G1 and the arrangement of refractive power in second lens group G2 in a most appropriate manner.

Therefore, the zoom lens in an embodiment of the present invention is configured so that the following conditional expressions (1), (2), (3) and (4) are satisfied:

$$1.75<Nd11 \quad (1);$$

$$28<vd11<44 \quad (2);$$

$$63<vd12 \quad (3); \text{ and}$$

$$0.020<|f2|/ft<0.050 \quad (4), \text{ where}$$

Nd11: a refractive index of the 11-th lens for d-line,
vd11: an Abbe number of the 11-th lens for d-line,
vd12: an Abbe number of the 12-th lens for d-line,
f2: a focal length of the second lens group, and
ft: a focal length of an entire system at a telephoto end.

Conditional expression (1) defines the refractive index of 11th lens L11. If the value is lower than the lower limit of conditional expression (1), a Petzval sum of overcorrection is generated, and it becomes difficult to suppress curvature of field.

Conditional expression (2) defines the Abbe number of 11th lens L11. If the value is lower than the lower limit of conditional expression (2), when achromatization is performed by a combination of 11th lens L11 and a positive lens or lenses arranged in first lens group G1, a difference in dispersion between 11th lens L11 and the positive lens or lenses becomes large, and the refractive power of a lens or lenses in first lens group G1 becomes weak. That is advantageous to correction of a spherical aberration, but it becomes difficult to suppress generation of chromatic aberrations on a short wavelength side at a telephoto side. In contrast, if the value exceeds the upper limit of conditional expression (2), the refractive power of each lens arranged in first lens group G1 becomes strong. Therefore, it becomes difficult to correct especially a spherical aberration at a telephoto side.

Conditional expression (3) defines the Abbe number of 12th lens L12. If the value is lower than the lower limit of conditional expression (3), it becomes difficult to correct a longitudinal chromatic aberration at a telephoto side. Especially, when correction of chromatic aberrations by a combination of 11th lens L11 made of material satisfying conditional expression (2) and 12th lens L12 is considered, the refractive power of 12th lens L12 becomes strong. Consequently, it becomes difficult to correct a spherical aberration and curvature of field at a telephoto side.

Conditional expression (4) defines a relationship between the focal length of second lens group G2 and the focal length of an entire system at a telephoto end. When the value is lower than the lower limit of conditional expression (4), the refractive power of second lens group G2 becomes too strong, and correction of various aberrations becomes difficult. It becomes difficult to correct especially curvature of field at a wide angle end. In contrast, if the value exceeds the upper limit of conditional expression (4), the refractive power of second lens group G2 is insufficient, and does not contribute to the variable magnification ratio, or the size of the whole lens barrel becomes large as the total length of the zoom lens becomes long or the diameter of a lens or lenses constituting first lens group G1 becomes large.

When the following conditional expressions (1-1), (2-1), (3-1) and (4-1) are satisfied, more excellent characteristics are achievable:

$$1.78<Nd11 \quad (1-1);$$

$$29<vd11<43 \quad (2-1);$$

$$66<vd12<85 \quad (3-1); \text{ and}$$

$$0.023<|f2|/ft<0.050 \quad (4-1).$$

If a material exceeding the upper limit of conditional expression (3-1) is used as the material of 12th lens L12, the anomalous dispersion properties become high. Therefore, that is advantageous to correction of chromatic aberrations. However, the production cost increases. Therefore, it is more desirable to select a material that does not exceed the upper limit of conditional expression (3-1), depending on required specification and optical performance.

When the following conditional expressions (1-1), (2-2), (3-1) and (4-2) are satisfied, more excellent characteristics are achievable:

$$1.78<Nd11 \quad (1-1);$$

$$30<vd11<42 \quad (2-2);$$

$$66<vd12<85 \quad (3-1); \text{ and}$$

$$0.027<|f2|/ft<0.050 \quad (4-2).$$

In a zoom lens according to an embodiment of the present invention, it is desirable that second lens group G2 includes at least one positive lens, and that the following conditional expression (5) is satisfied. Conditional expression (5) defines the Abbe number of a positive lens or lenses arranged in second lens group G2. If the value is lower than the lower limit of conditional expression (5), it becomes difficult to suppress a secondary spectrum. In contrast, if the value exceeds the upper limit of conditional expression (5), it becomes impossible to effectively perform primary achromatization. When the following conditional expression (5-1) is satisfied, more excellent properties are achievable:

$$15<vd2p<23 \quad (5); \text{ and}$$

$$16<vd2p<22 \quad (5-1), \text{ where}$$

vd2p: an Abbe number of the at least one positive lens in the second lens group for d-line.

Further, it is desirable that the following conditional expression (6) is satisfied. Conditional expression (6) defines the Abbe number of 13th lens L13. If the value is outside the range of conditional expression (6), it becomes difficult to correct a longitudinal chromatic aberration and a lateral chromatic aberration in a well-balanced manner through the entire zoom range. Especially, if the value is lower than the lower limit of conditional expression (6), it becomes difficult to correct a longitudinal chromatic aberration at a telephoto side. In contrast, if the value exceeds the upper limit of conditional expression (6), it becomes difficult to correct a lateral chromatic aberration at a wide angle side. When the following conditional expression (6-1) is satisfied, more excellent properties are achievable.

$$50<vd13<75 \quad (6); \text{ and}$$

$$52<vd13<72 \quad (6-1), \text{ where}$$

vd13: an Abbe number of the 13th lens.

Further, it is desirable that third lens group G3 includes at least one cemented lens including a positive lens, and that the following conditional expression (7) is satisfied. Conditional expression (7) defines the Abbe number of a positive lens constituting the cemented lens arranged in third lens group G3. For the purpose of reducing the size of the zoom lens or the like, when the negative refractive power of second lens group G2 is increased in such a manner that the value is lower than the upper limit of conditional expression (4), or when a positive lens satisfying conditional expression (5) is arranged, these lenses are made of material of high refractive index and high dispersion. In that case, chromatic aberrations in second lens group G2 tend to be undercorrected. If the value is lower than the lower limit of conditional expression (7), chromatic aberrations generated in second lens group G2 are not fully corrected. When the following conditional expression (7-1) is satisfied, and more desirably, when the following conditional expression (7-2) is satisfied, more excellent properties are achievable:

$$65 < vd3pc \quad (7);$$

$$67 < vd3pc \quad (7\text{-}1); \text{ and}$$

$$80 < vd3pc \quad (7\text{-}2), \text{ where}$$

vd3pc: an Abbe number of the positive lens constituting the at least one cemented lens for d-line.

Further, it is desirable that the following conditional expression (8) is satisfied. Conditional expression (8) defines a relationship between the focal length of first lens group G1 and the focal length of second lens group G2. If the value is lower than the lower limit of conditional expression (8), the refractive power of first lens group G1 becomes strong, and that is advantageous to reduction in size. However, aberrations generated in first lens group G1 increase. Further, it becomes difficult to correct a lateral chromatic aberration generated at a wide angle side. Or, the refractive power of second lens group G2 becomes weak, and does not contribute to the variable magnification ratio, or the total length of the zoom lens becomes long. In contrast, if the value exceeds the upper limit of conditional expression (8), the refractive power of first lens group G1 becomes weak, and the total length of the lens becomes long, and the outer diameter of first lens group G1 becomes large. Or, the refractive power of second lens group G2 becomes strong, and aberrations generated in second lens group G2 increase. When the following conditional expression (8-1) is satisfied, and more desirably, when the following conditional expression (8-2) is satisfied, more excellent properties are achievable:

$$8.5 < f1/|f2| < 16.0 \quad (8);$$

$$9.0 < f1/|f2| < 15.0 \quad (8\text{-}1); \text{ and}$$

$$10.0 < f1/|f2| < 14.0 \quad (8\text{-}2), \text{ where}$$

f1: a focal length of the first lens group.

It is desirable that the following conditional expression (9) is satisfied. Conditional expression (9) defines a relationship between the focal length of fourth lens group G4 and the focal length of the entire system at a wide angle end and at a telephoto end. If the value is lower than the lower limit of conditional expression (9), the refractive power of fourth lens group G4 becomes strong. Therefore, that is advantageous to reducing the size of the zoom lens. However, aberrations generated in fourth lens group G4 increase. Therefore, it becomes difficult to excellently correct aberrations through the entire zoom range. In contrast, if the value exceeds the upper limit of conditional expression (9), the refractive power of fourth lens group G4 becomes weak.

Therefore, it becomes difficult to reduce the size of the zoom lens. When the following conditional expression (9-1) is satisfied, and more desirably, when the following conditional expression (9-2) is satisfied, more excellent properties are achievable:

$$0.3 < |f4|/(fw \times ft)1/2 < 1.4 \quad (9);$$

$$0.4 < |f4|/(fw \times ft)1/2 < 1.3 \quad (9\text{-}1); \text{ and}$$

$$0.5 < |f4|/(fw \times ft)1/2 < 1.1 \quad (9\text{-}2), \text{ where}$$

f4: a focal length of the fourth lens group, and
fw: a focal length of an entire system at a wide angle end.

Further, it is desirable that following conditional expression (10) is satisfied. Conditional expression (10) defines the ratio of the focal length of fifth lens group G5 to the focal length of fourth lens group G4. If the value is lower than the lower limit of conditional expression (10), the refractive power of fifth lens group G5 becomes strong, and it becomes difficult to correct a coma aberration at a wide angle side. In contrast, if the value exceeds the upper limit of conditional expression (10), the refractive power of fourth lens group G4 becomes strong, and it becomes difficult to correct a spherical aberration at a telephoto side. When the following conditional expression (10-1) is satisfied, and more desirably, when the following conditional expression (10-2) is satisfied, more excellent properties are achievable:

$$0.3 < f5/|f4| < 1.5 \quad (10);$$

$$0.4 < f5/|f4| < 1.3 \quad (10\text{-}1); \text{ and}$$

$$0.5 < f5/|f4| < 1.2 \quad (10\text{-}2), \text{ where}$$

f5: a focal length of the fifth lens group, and
f4: a focal length of the fourth lens group.

Further, it is desirable that at least first lens group G1, second lens group G2, third lens group G3 and fourth lens group G4 move in such a manner that a distance between first lens group G1 and second lens group G2 increases, and a distance between second lens group G2 and third lens group G3 decreases, and a distance between third lens group G3 and fourth lens group G4 increases and a distance between fourth lens group G4 and fifth lens group G5 increases in the telephoto end state than their distances in the wide angle end state, respectively. Accordingly, the variable magnification ratio is easily increased.

Further, it is desirable that second lens group G2 consists of four lenses of a negative lens, a negative lens, and a cemented lens of a positive lens and a negative lens in this order from the object side. When two negative single lenses are arranged closer to the object side in second lens group G2 in this manner, it is possible to make the position of an object-side principal point of second lens group G2 closer to first lens group G1. Therefore, it is possible to reduce the size of first lens group G1 for both of the diameter of first lens group G1 and the size of first lens group G1 in the direction of the optical axis.

Further, it is desirable that third lens group G3 includes at least two positive lenses and at least two negative lenses. Accordingly, it is possible to correct aberrations in a well-balanced manner through the entire zoom range even if F-number FNo. is reduced. Further, that is advantageous also to correction of a longitudinal chromatic aberration.

Further, it is desirable that fifth lens group G5 consists of one lens. Accordingly, it is possible to achieve reduction in size and cost.

Further, it is desirable that fifth lens group G5 does not have a movement mechanism, and is always fixed. Accordingly, when the zoom lens is mounted on an imaging apparatus, such as a digital camera, it is possible to reduce adhesion of unwanted particles or dust to an imaging device.

Further, it is desirable that fourth lens group G4 consists of two lenses of a positive lens and a negative lens. Accordingly, it is possible to suppress a fluctuation of aberrations caused by the movement of fourth lens group G4 to a low level.

Further, it is desirable that focusing is performed by moving fourth lens group G4. When focusing is performed in this manner by using fourth lens group G4, which consists of a small number of lens or lenses, and the diameter of which is small, compared with the other lens groups, it is possible to increase the speed of focusing.

Specifically, in the zoom lens of the present invention, it is desirable to use glass, as a material arranged closest to the object side. Alternatively, transparent ceramic may be used.

When the zoom lens of the present invention is used in tough conditions, it is desirable that a multi-layer coating for protection is applied to the zoom lens. Further, an anti-reflection coating for reducing ghost light during use or the like may be applied to the zoom lens in addition to the coating for protection.

FIG. 1 illustrates an example in which optical member PP is arranged between the lens system and image plane Sim. Instead of arranging various filters, such as a low-pass filter and a filter that cuts a specific wavelength band, and the like between the lens system and image plane Sim, the various filters may be arranged between lenses. Alternatively, a coating having a similar action to the various filters may be applied to a lens surface of one of the lenses.

Next, numerical value examples of the zoom lens of the present invention will be described.

First, the zoom lens in Example 1 will be described. FIG. 1 is a cross section illustrating the lens configuration of the zoom lens in Example 1. In FIG. 1 and FIGS. 3 through 8 corresponding to Examples 2 through 7, which will be described later, optical member PP is also illustrated, and the left side is an object side, and the right side is an image side. Illustrated aperture stop St does not necessarily represent the size nor the shape of the aperture stop, but the position of the aperture stop on optical axis Z.

The zoom lens in Example 1 consists of first lens group G1 having positive refractive power, second lens group G2 having negative refractive power, aperture stop St, third lens group G3 having positive refractive power, fourth lens group G4 having negative refractive power, and fifth lens group G5 having positive refractive power in this order from an object side.

First lens group G1 consists of three lenses of negative lens L11, positive lens L12 cemented with negative lens L11, and positive lens L13 in this order from the object side. The cemented lens consisting of negative lens L11 and positive lens L12 has an effect of correcting a longitudinal chromatic aberration at a telephoto side. Positive lens L13 has an effect of correcting curvature of field at a telephoto end. Further, since first lens group G1 consists of three lenses, reduction in the size and cost of the lens system is achieved.

Second lens group G2 consists of four lenses of negative lens L21, negative lens L22, positive lens L23 and negative lens L24 cemented with positive lens L23 in this order from the object side. When two negative single lenses are sequentially arranged from the object side, it is possible to make the position of an object-side principal point of second lens group G2 closer to first lens group G1. Therefore, it is possible to reduce the diameter of first lens group G1. Further, the cemented lens consisting of positive lens L23 and negative lens L24 has an effect of correcting a lateral chromatic aberration at a wide angle end.

Third lens group G3 consists of seven lenses of positive lens L31, negative lens L32 cemented with positive lens L31, positive lens L33, negative lens L34 cemented with positive lens L33, positive lens L35 having an aspheric surface shape, negative lens L36 and positive lens L37 cemented with negative lens L36 in this order from the object side. The cemented lens consisting of positive lens L31 and negative lens L32 has an effect of correcting a spherical aberration and a longitudinal chromatic aberration through an entire variable magnification range. The cemented lens consisting of positive lens L33 and negative lens L34 has an effect of correcting a longitudinal chromatic aberration and a lateral chromatic aberration through an entire variable magnification range. Positive lens L35 having an aspheric surface shape has an effect of correcting a spherical aberration and curvature of field at a telephoto side. The cemented lens consisting of negative lens L36 and positive lens L37 has an effecting of correcting a lateral chromatic aberration through an entire variable magnification range.

Fourth lens group G4 consists of two lenses of negative lens L41 and positive lens L42 having an aspheric surface shape in this order from the object side. When a positive lens and a negative lens are arranged, it is possible to suppress a fluctuation of chromatic aberrations caused by movement of fourth lens group G4 to a low level.

Fifth lens group G5 consists of one lens of positive lens L51 having an aspheric surface shape. Positive lens L51 has an effect of correcting distortion and curvature of field through an entire variable magnification range. Further, when fifth lens group G5 consists of one lens, reduction in size, weight and cost is achieved.

In the zoom lens, first lens group G1, second lens group G2, third lens group G3 and the fourth lens group G4 move in such a manner that a distance between first lens group G1 and second lens group G2 increases, and a distance between second lens group G2 and third lens group G3 decreases, and a distance between third lens group G3 and fourth lens group G4 increases and a distance between fourth lens group G4 and fifth lens group G5 increases in the telephoto end state than their distances in the wide angle end state, respectively. Further, fifth lens group G5 is fixed.

Focusing is performed by moving fourth lens group G4.

The zoom lens is configured in such a manner that the cemented lens consisting of negative lens L36 and positive lens L37 is movable in a direction perpendicular to the optical axis to prevent image shaking. When the lens for preventing image shaking consists of a cemented lens, it is possible to suppress a fluctuation of chromatic aberrations caused by movement of the lens to a low level.

Table 1 shows basic lens data of the zoom lens in Example 1. Table 2 shows data about the specification of the zoom lens in Example 1. Table 3 shows data about moving surface distances. Table 4 shows data about aspheric surface coefficients. In the following descriptions, the meanings of signs in the tables will be described by using the tables of Example 1, as an example. The meanings of signs in the tables of Examples 2 through 7 are basically similar to those of Example 1.

In the lens data of Table 1, a column of Si shows the surface number of an i-th surface (i=1, 2, 3 . . . ) when a surface of composition elements closest to the object side is the first surface and the surface numbers sequentially increase toward the image side. A column of Ri shows the curvature radius of the i-th surface. A column of Di shows a distance, on optical axis Z, between the i-th surface and (i+1)th surface. Further, a column of Ndj shows the refractive index of a j-th optical element (j=1, 2, 3 . . . ) for d-line (wavelength is 587.6 nm) when an optical element closest to the object side is the first optical element and j sequentially increases toward the image side. A column of vdj similarly shows the Abbe number of the j-th optical element for d-line (wavelength is 587.6 nm).

Here, the sign of a curvature radius is positive when a surface shape is convex toward the object side, and negative when a surface shape is convex toward the image side. The basic lens data show data including aperture stop St and optical member PP. In the column of surface numbers, the term "(STOP)" is written together with the surface number of a surface corresponding to aperture stop St.

Further, in the lens data of Table 1, "DD[i]" is written in a row of a surface distance that changes during magnification change. Further, a value at the bottom of the column of Di is a distance between an image-side surface of optical member PP and image plane Sim.

Data about specification in Table 2 show values of a zoom ratio, focal length f, F-number FNo. and full angle of view 2ω for each of wide angle, middle and telephoto.

In the basic lens data, data about specification and data about moving surface distances, degree is used as the unit of an angle, and mm is used as the unit of a length. However, since an optical system is usable by proportionally enlarging the optical system or by proportionally reducing the optical system, other appropriate units may be used.

In the lens data of Table 1, mark "*" is attached to the surface numbers of aspheric surfaces. Further, a numerical value of a paraxial curvature radius is used as the curvature radius of an aspheric surface. The data about aspheric surface coefficients in Table 4 show surface numbers Si of aspheric surfaces and aspheric surface coefficients about the aspheric surfaces. The aspheric surface coefficients are values of coefficients KA, Am (m=3, 4, 5, . . . 20) in an aspheric surface equation represented by the following equation (A):

$$Zd = C \cdot h^2 / \{1 + (1 - KA \cdot C^2 \cdot h^2)^{1/2}\} + \Sigma Am \cdot h^m \quad (A),$$

where,

Zd: the depth of an aspheric surface (the length of a perpendicular from a point on the aspheric surface at height h to a flat plane that contacts with the vertex of the aspheric surface and is perpendicular to the optical axis), h: height (a length from the optical axis), C: a reciprocal of a paraxial curvature radius, and KA, Am: aspheric surface coefficients (m=3, 4, 5, . . . 20).

TABLE 1

EXAMPLE 1 - LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 190.5660 | 1.51 | 1.83400 | 37.16 |
| 2 | 47.6350 | 5.95 | 1.48749 | 70.23 |
| 3 | −255.1477 | 0.11 | | |
| 4 | 48.4503 | 4.78 | 1.60311 | 60.64 |
| 5 | 661.0686 | DD[5] | | |
| 6 | 102.1754 | 0.86 | 1.83481 | 42.73 |
| 7 | 8.5281 | 4.46 | | |
| 8 | −17.7998 | 0.88 | 1.90366 | 31.32 |
| 9 | 76.2591 | 0.11 | | |
| 10 | 24.0501 | 3.35 | 1.94595 | 17.98 |
| 11 | −37.8880 | 0.80 | 1.72916 | 54.68 |

TABLE 1-continued

EXAMPLE 1 - LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 12 | 117.0060 | DD[12] | | |
| 13(STOP) | ∞ | 1.50 | | |
| 14 | 9.1387 | 4.91 | 1.49700 | 81.54 |
| 15 | −15.6820 | 0.88 | 1.80400 | 46.58 |
| 16 | −24.3585 | 0.20 | | |
| 17 | −157.6928 | 2.09 | 1.80100 | 34.97 |
| 18 | −20.2930 | 0.88 | 1.76200 | 40.10 |
| 19 | 15.3575 | 0.41 | | |
| *20 | 7.6717 | 2.40 | 1.56864 | 58.62 |
| *21 | 9.5799 | 3.60 | | |
| 22 | 14.3576 | 0.76 | 1.61772 | 49.81 |
| 23 | 8.1030 | 3.10 | 1.49700 | 81.54 |
| 24 | −80.1409 | DD[24] | | |
| 25 | 19.7873 | 0.80 | 1.79952 | 42.22 |
| 26 | 7.1947 | 0.51 | | |
| *27 | 8.3796 | 2.10 | 1.53391 | 55.89 |
| *28 | 10.9061 | DD[28] | | |
| *29 | 469.3592 | 2.60 | 1.53391 | 55.89 |
| *30 | −7.3909 | 1.10 | | |
| 31 | ∞ | 0.80 | 1.51680 | 64.20 |
| 32 | ∞ | 2.55 | | |

TABLE 2

EXAMPLE 1 - SPECIFICATION (d-LINE)

| | WIDE ANGLE | MIDDLE | TELEPHOTO |
|---|---|---|---|
| ZOOM MAGNIFICATION RATIO | 1.0 | 7.7 | 47.1 |
| f | 4.44 | 34.30 | 209.39 |
| FNo. | 2.98 | 6.04 | 6.80 |
| 2ω[°] | 92.2 | 12.4 | 2.0 |

TABLE 3

EXAMPLE 1 - ZOOM DISTANCE

| | WIDE ANGLE | MIDDLE | TELEPHOTO |
|---|---|---|---|
| DD[5] | 0.58 | 48.12 | 73.66 |
| DD[12] | 37.99 | 13.41 | 2.45 |
| DD[24] | 2.65 | 8.91 | 14.05 |
| DD[28] | 2.91 | 14.27 | 18.46 |

TABLE 4

EXAMPLE 1 - ASPHERIC SURFACE COEFFICIENT

| | SURFACE NUMBER | | |
|---|---|---|---|
| | 20 | 21 | 27 |
| KA | 1.0000000E+00 | 1.0000000E+00 | 1.0000000E+00 |
| A3 | 2.6840949E−05 | 9.6307265E−06 | −4.5533282E−04 |
| A4 | −4.0306307E−04 | 7.3621072E−05 | −1.2918285E−03 |
| A5 | 2.5198056E−06 | −2.6145919E−06 | 3.2078380E−04 |
| A6 | −9.5112872E−06 | −4.5823516E−06 | −1.0687848E−04 |
| A7 | −2.6237590E−06 | −3.5876523E−06 | −1.6051072E−05 |
| A8 | 2.1471331E−07 | −4.5619492E−07 | 1.6277933E−05 |
| A9 | −7.1179356E−09 | 2.6697425E−08 | 1.0136115E−06 |
| A10 | −1.6215254E−09 | 3.7583410E−08 | −1.2342175E−06 |
| A11 | −3.2592544E−09 | 5.5519309E−09 | 1.8817130E−09 |
| A12 | −5.5670711E−10 | −1.4229821E−09 | −2.8331680E−08 |
| A13 | −2.1318200E−11 | −9.5993415E−10 | −3.1637844E−09 |
| A14 | 6.1660347E−11 | 1.2919125E−10 | 3.3690565E−09 |

TABLE 4-continued

EXAMPLE 1 - ASPHERIC SURFACE COEFFICIENT

| A15 | 9.4765495E-12 | 3.2299721E-12 | 1.1375237E-09 |
|---|---|---|---|
| A16 | 2.2768029E-13 | 7.2930789E-13 | 2.0965110E-10 |
| A17 | -4.2298985E-13 | 1.4521435E-13 | -1.9468436E-11 |
| A18 | -1.9822796E-13 | 2.5577813E-14 | -5.7315055E-11 |
| A19 | -1.9192457E-14 | -4.5492169E-16 | 1.1707052E-11 |
| A20 | 1.0838208E-14 | -1.5156669E-15 | -8.8917300E-13 |

| | SURFACE NUMBER | | |
|---|---|---|---|
| | 28 | 29 | 30 |
| KA | 1.0000000E+00 | 1.0000000E+00 | 1.0000000E+00 |
| A3 | -7.8046373E-04 | 4.1389256E-03 | 6.4276109E-03 |
| A4 | -9.0593396E-04 | -1.7407938E-03 | -2.1835610E-03 |
| A5 | -3.6516432E-04 | -1.8614071E-04 | 3.7348826E-04 |
| A6 | 9.5544087E-05 | 5.8185227E-05 | -3.8126997E-05 |
| A7 | 3.5954706E-05 | -7.1731920E-07 | -6.2222952E-06 |
| A8 | -1.3611027E-05 | -1.0090005E-06 | 1.3099766E-06 |
| A9 | -2.4072648E-06 | -4.8213431E-08 | 3.4186661E-07 |
| A10 | 1.8850003E-07 | 6.7023680E-08 | 7.0027606E-09 |
| A11 | 6.3401887E-07 | 4.3549929E-09 | -5.2174530E-08 |
| A12 | -9.3299572E-08 | 4.5644935E-10 | -1.3116009E-09 |
| A13 | -3.9007838E-09 | -1.5366353E-10 | -6.1769255E-11 |
| A14 | -4.4058901E-09 | -7.7327336E-11 | 2.4659817E-11 |
| A15 | -6.7430841E-10 | -1.3480473E-11 | 1.9511726E-12 |
| A16 | 4.6896009E-11 | -2.8760743E-13 | -1.3535040E-12 |
| A17 | -5.3144357E-12 | 3.0669242E-13 | -3.9170140E-14 |
| A18 | 7.7085581E-11 | 1.2921973E-13 | 1.9739940E-14 |
| A19 | -2.4348533E-12 | 1.5038695E-14 | 1.8928268E-14 |
| A20 | -2.8770423E-12 | -4.6753424E-15 | -2.5889239E-15 |

Figure 9:
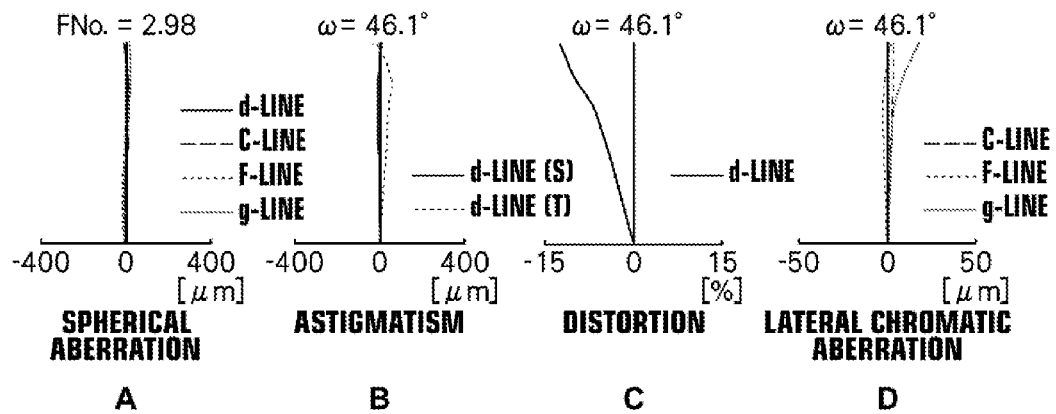
FIG. 9 is aberration diagrams (Sections A through L) of the zoom lens in Example 1 of the present invention.
Figure 9:
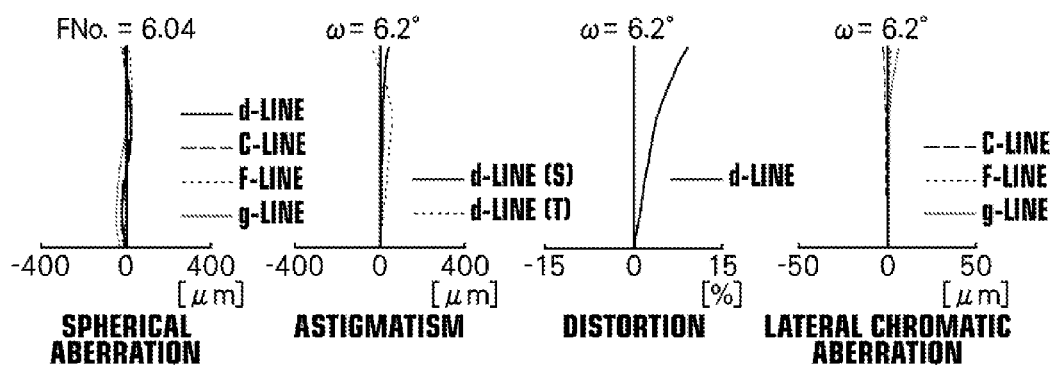
Figure 9:
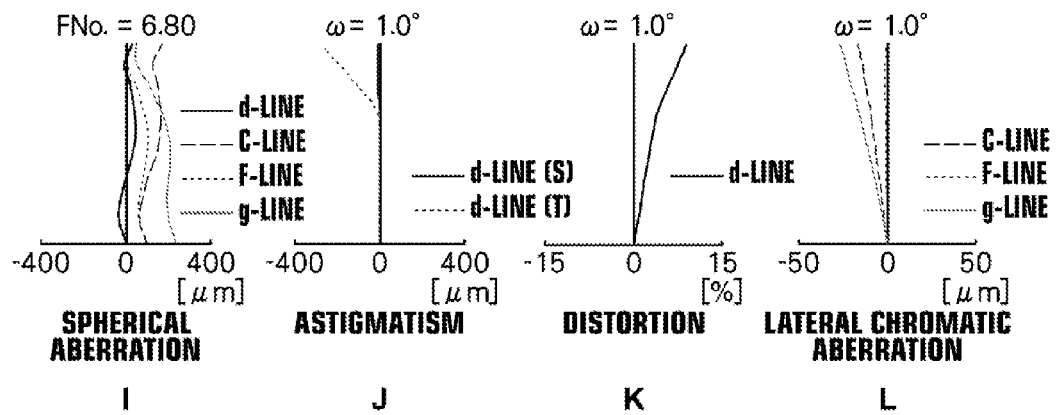

FIG. 9, Sections A through L are aberration diagrams of the zoom lens in Example 1. FIG. 9, Sections A through D illustrate a spherical aberration, astigmatism, distortion and a lateral chromatic aberration at wide angle, respectively. FIG. 9, Sections E through H illustrate a spherical aberration, astigmatism, distortion and a lateral chromatic aberration at middle, respectively. FIG. 9, Sections I through L illustrate a spherical aberration, astigmatism, distortion and a lateral chromatic aberration at telephoto, respectively.

Aberration diagrams of a spherical aberration, astigmatism and distortion show aberrations when d-line (wavelength is 587.6 nm) is a reference wavelength. In the aberration diagram of the spherical aberration, aberrations for d-line (wavelength is 587.6 nm), C-line (wavelength is 656.3 nm), F-line (wavelength is 486.1 nm) and g-line (wavelength is 435.8 nm) are indicated by a solid line, a long broken line, a short broken line and a gray solid line, respectively. In the aberration diagram of the astigmatism, an aberration in a sagittal direction and an aberration in a tangential direction are indicated by a solid line and a broken line, respectively. In the aberration diagram of the lateral chromatic aberration, an aberration for C-line (wavelength is 656.3 nm), an aberration for F-line (wavelength is 486.1 nm) and an aberration for g-line (wavelength is 435.8 nm) are indicated by a long broken line, a short broken line and a gray solid line, respectively. In the aberration diagram of the spherical aberration, Fno. represents an F-number. In the other aberration diagrams, ω means a half angle of view.

Figure 3:
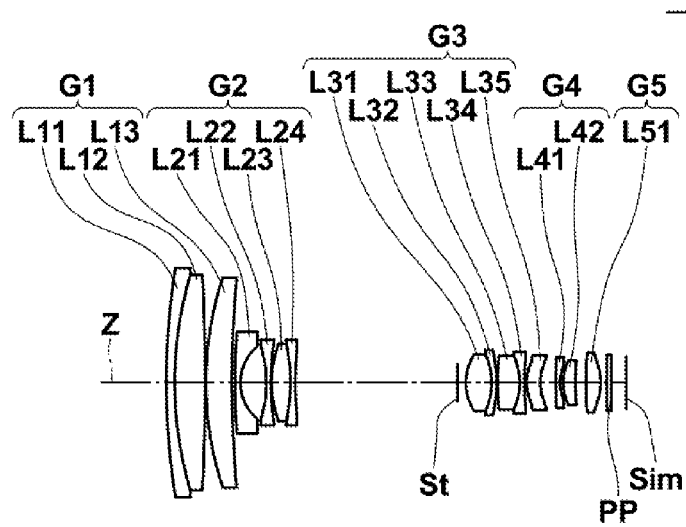
FIG. 3 is a cross section illustrating the lens configuration of a zoom lens in Example 2 of the present invention.
Figure 3:
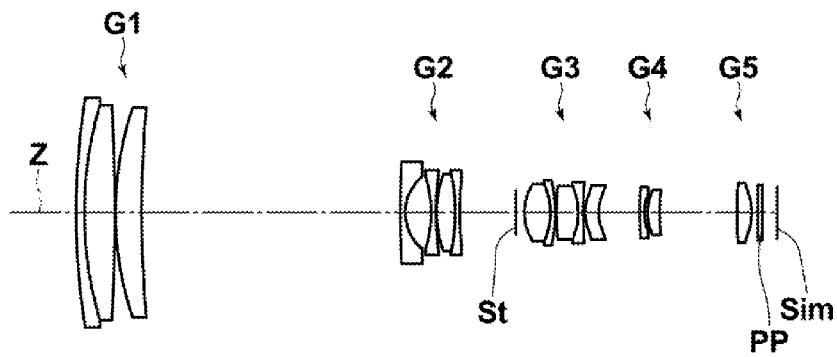
Figure 3:
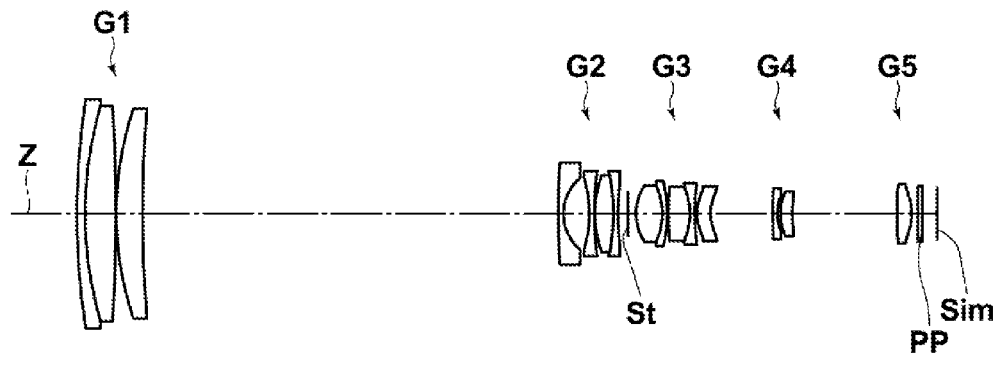

Next, a zoom lens in Example 2 will be described. FIG. 3 is a cross section illustrating the lens configuration of the zoom lens in Example 2.

In the zoom lens of Example 2, only the configuration of third lens group G3 differs from the zoom lens of Example 1.

In the zoom lens of Example 2, third lens group G3 consists of five lenses of positive lens L31, negative lens L32 cemented with positive lens L31, positive lens L33, negative lens L34 cemented with positive lens L33, and positive lens L35 having an aspheric surface shape in this order from the object side. The cemented lens consisting of positive lens L31 and negative lens L32 has an effect of correcting a spherical aberration and a longitudinal chromatic aberration through an entire variable magnification range. The cemented consisting of positive lens L33 and negative lens L34 has an effect of correcting a longitudinal chromatic aberration and a lateral chromatic aberration through an entire variable magnification range. Positive lens L35 having an aspheric surface shape has an effect of correcting a spherical aberration and curvature of field at a telephoto side.

The zoom lens may be configured in such a manner that the whole third lens group G3 is movable in a direction perpendicular to the optical axis to prevent image shaking.

Figure 10:
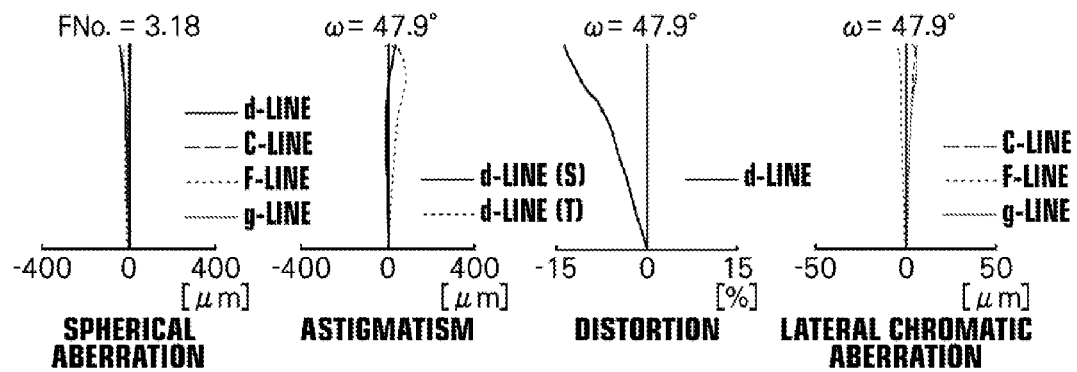
FIG. 10 is aberration diagrams (Sections A through L) of the zoom lens in Example 2 of the present invention.
Figure 10:
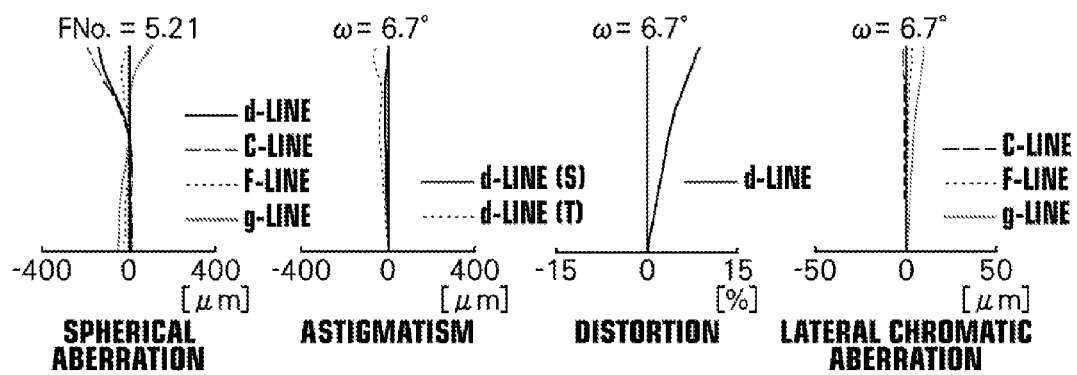
Figure 10:
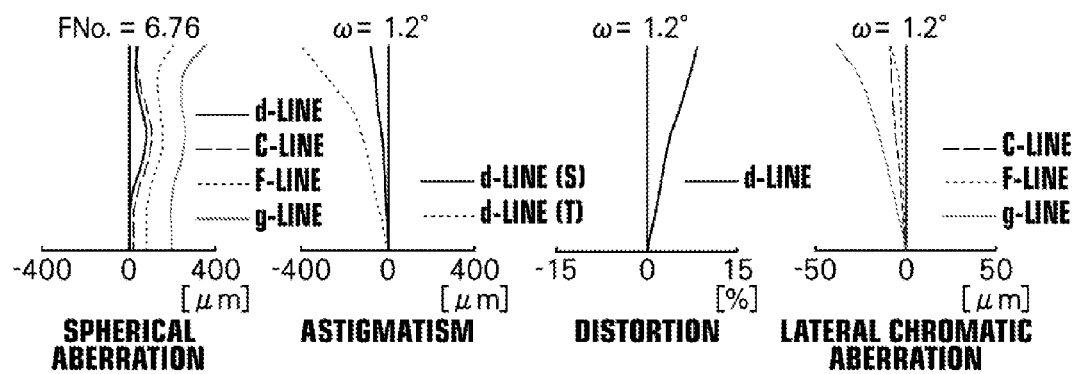

Table 5 shows basic lens data of the zoom lens in Example 2. Table 6 shows data about the specification of the zoom lens in Example 2. Table 7 shows data about moving surface distances. Table 8 shows data about aspheric surface coefficients. FIG. 10, Sections A through L illustrate aberration diagrams.

TABLE 5

EXAMPLE 2 - LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 126.0626 | 1.51 | 1.90366 | 31.32 |
| 2 | 64.3848 | 5.63 | 1.49700 | 81.54 |
| 3 | -320.7357 | 0.10 | | |
| 4 | 56.2313 | 4.80 | 1.59282 | 68.63 |
| 5 | 200.0000 | DD[5] | | |
| 6 | 130.1741 | 0.95 | 1.83481 | 42.71 |
| 7 | 8.0771 | 4.80 | | |
| 8 | -20.7044 | 0.88 | 1.80610 | 40.92 |
| 9 | 54.3462 | 0.10 | | |
| 10 | 19.2493 | 3.41 | 1.92285 | 20.88 |
| 11 | -32.9858 | 0.88 | 1.88300 | 40.76 |
| 12 | 57.2176 | DD[12] | | |
| 13(STOP) | ∞ | 1.50 | | |
| 14 | 8.7978 | 4.81 | 1.49700 | 81.54 |
| 15 | -11.4527 | 0.88 | 1.82232 | 41.92 |
| 16 | -23.4480 | 0.20 | | |
| 17 | 44.1961 | 4.00 | 1.71299 | 53.87 |
| 18 | -11.3799 | 0.88 | 1.79952 | 42.22 |
| 19 | 47.6322 | 0.40 | | |
| *20 | 7.0327 | 2.50 | 1.56854 | 58.62 |
| *21 | 7.3629 | DD[21] | | |
| 22 | 89.3762 | 0.80 | 1.83400 | 37.16 |
| 23 | 7.8423 | 0.60 | | |
| *24 | 8.5045 | 2.20 | 1.53391 | 55.89 |
| *25 | 32.8653 | DD[25] | | |
| *26 | 3459.9189 | 2.70 | 1.53391 | 55.89 |
| *27 | -7.3838 | 1.10 | | |
| 28 | ∞ | 0.80 | 1.51680 | 64.20 |
| 29 | ∞ | 2.75 | | |

TABLE 6

EXAMPLE 2 - SPECIFICATION (d-LINE)

| | WIDE ANGLE | MIDDLE | TELEPHOTO |
|---|---|---|---|
| ZOOM MAGNIFICATION RATIO | 1.0 | 7.5 | 47.1 |
| f | 4.26 | 31.93 | 200.44 |
| FNo. | 3.18 | 5.21 | 6.76 |
| 2ω[°] | 95.8 | 13.4 | 2.4 |

TABLE 7

EXAMPLE 2 - ZOOM DISTANCE

|  | WIDE ANGLE | MIDDLE | TELEPHOTO |
|---|---|---|---|
| DD[5] | 0.58 | 47.49 | 76.42 |
| DD[12] | 29.83 | 10.33 | 1.80 |
| DD[21] | 2.87 | 7.58 | 11.44 |
| DD[25] | 2.00 | 14.27 | 19.26 |

TABLE 8

EXAMPLE 2 - ASPHERIC SURFACE COEFFICIENT

| | SURFACE NUMBER | | |
|---|---|---|---|
| | 20 | 21 | 24 |
| KA | 0.0000000E+00 | 0.0000000E+00 | 9.9858849E-01 |
| A3 | 3.5194825E-05 | 2.4877428E-05 | -7.9448771E-04 |
| A4 | -9.1259035E-05 | 2.7370653E-04 | -1.4106330E-04 |
| A5 | -3.4848057E-05 | 9.7021289E-06 | -1.8868792E-04 |
| A6 | -2.8299394E-06 | -1.7770410E-05 | 5.3762494E-06 |
| A7 | -1.6336898E-06 | -4.6460453E-06 | 2.2735299E-05 |
| A8 | -3.6190710E-07 | -5.2997309E-07 | 4.1530284E-06 |
| A9 | -1.0333655E-07 | -7.6318024E-08 | 1.1800520E-09 |
| A10 | -1.2786129E-08 | -3.4229251E-09 | -4.0983097E-07 |
| A11 | -1.8566621E-09 | 5.0110763E-10 | -6.2334264E-08 |
| A12 | 1.8000150E-10 | 2.3836828E-10 | -2.8331680E-08 |
| A13 | 1.0931229E-10 | 4.4141144E-11 | -3.1637844E-09 |
| A14 | 2.5380661E-11 | 7.0902347E-12 | 3.3690565E-09 |
| A15 | 9.4765495E-12 | 3.2299721E-12 | 1.1375237E-09 |
| A16 | 2.2768029E-13 | 7.2930789E-13 | 2.0965110E-10 |
| A17 | -4.2298985E-13 | 1.4521435E-13 | -1.9468436E-11 |
| A18 | -1.9822796E-13 | 2.5577813E-14 | -5.7315055E-11 |
| A19 | -1.9192457E-14 | -4.5492169E-16 | 1.1707052E-11 |
| A20 | 1.0838208E-14 | -1.5156669E-15 | -8.8917300E-13 |

| | SURFACE NUMBER | | |
|---|---|---|---|
| | 25 | 26 | 27 |
| KA | -3.4356281E-02 | -1.5919206E-02 | 6.0897382E-01 |
| A3 | -3.7929976E-04 | 3.8177383E-03 | 5.3885518E-03 |
| A4 | -6.9961451E-04 | -1.6572658E-03 | -1.7916006E-03 |
| A5 | 1.0168216E-04 | 5.3459736E-05 | 5.5287290E-04 |
| A6 | 7.3843981E-06 | 7.2602184E-05 | -4.3329082E-05 |
| A7 | -1.6226768E-06 | -4.8974929E-06 | -9.9407611E-06 |
| A8 | 2.0881076E-07 | -1.8692134E-06 | 1.1038055E-06 |
| A9 | 3.1749046E-07 | 1.5162102E-08 | 3.1755849E-07 |
| A10 | 2.7569861E-07 | 5.9534773E-08 | 3.0676327E-08 |
| A11 | 2.8387925E-08 | 9.1638701E-09 | -2.3009594E-09 |
| A12 | 6.0966231E-09 | 5.7322777E-10 | -1.1315956E-09 |
| A13 | -3.9007838E-09 | -2.0838522E-10 | -1.8971726E-10 |
| A14 | -4.4058901E-09 | -7.7327336E-11 | -1.2784100E-11 |
| A15 | -6.7430841E-10 | -1.3480473E-11 | 1.9511726E-12 |
| A16 | 4.6896009E-11 | -2.8760743E-13 | -5.4179089E-14 |
| A17 | -5.3144357E-12 | 3.0669242E-13 | -3.9170140E-14 |
| A18 | 7.7085581E-11 | 1.2921973E-13 | 1.9739940E-14 |
| A19 | -2.4348533E-12 | 1.5038695E-14 | 1.8928268E-14 |
| A20 | -2.8770423E-12 | -4.6753424E-15 | -2.5889239E-15 |

Figure 4:
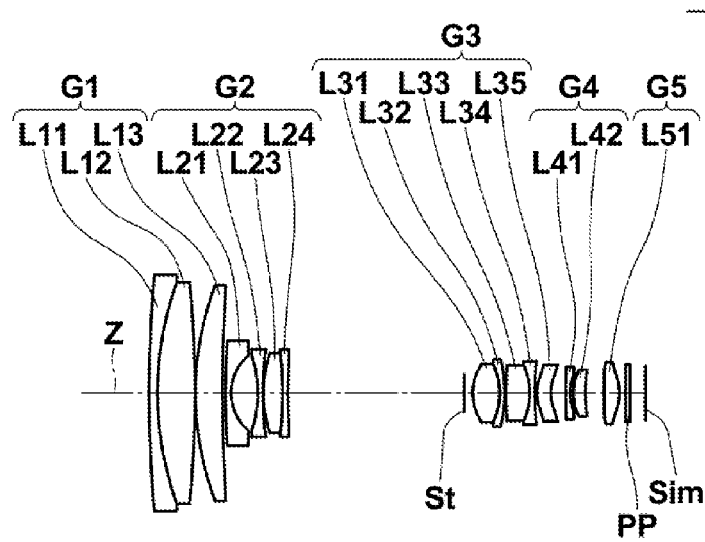
FIG. 4 is a cross section illustrating the lens configuration of a zoom lens in Example 3 of the present invention.
Figure 4:
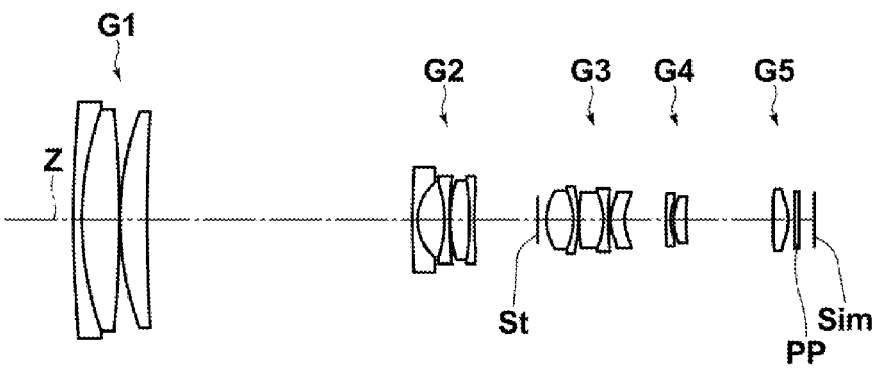
Figure 4:
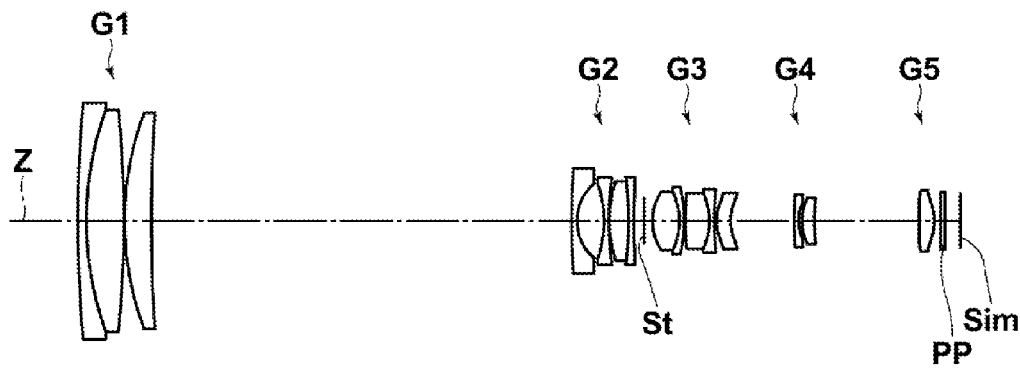

Next, a zoom lens in Example 3 will be described. FIG. 4 is a cross section illustrating the lens configuration of the zoom lens in Example 3.

The shape of the zoom lens in Example 3 is similar to that of the zoom lens in Example 2.

Figure 11:
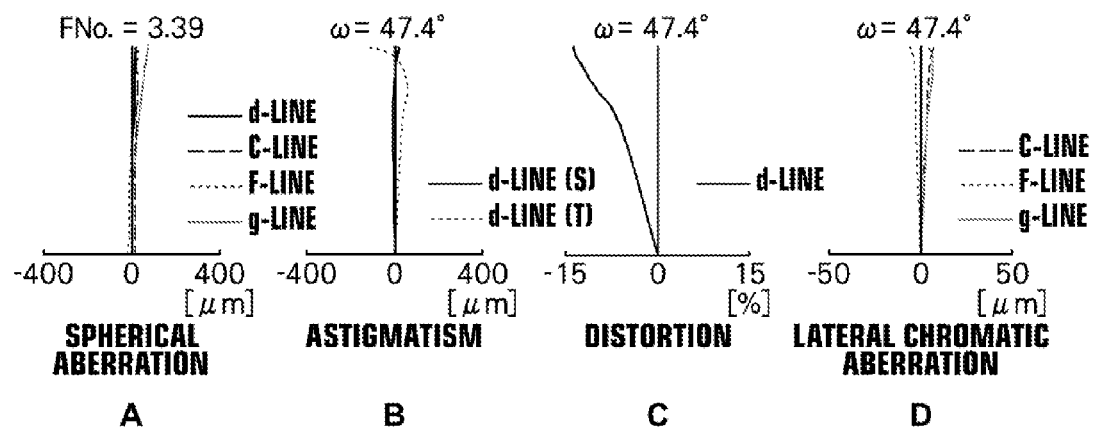
FIG. 11 is aberration diagrams (Sections A through L) of the zoom lens in Example 3 of the present invention.
Figure 11:
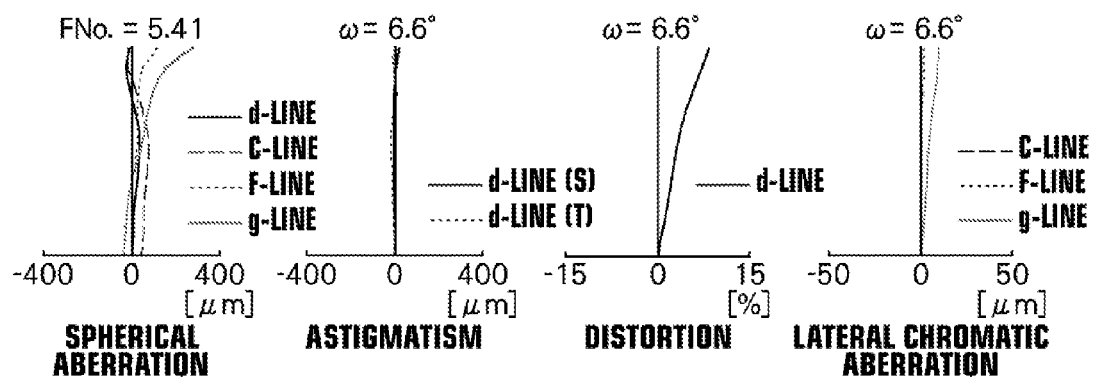
Figure 11:
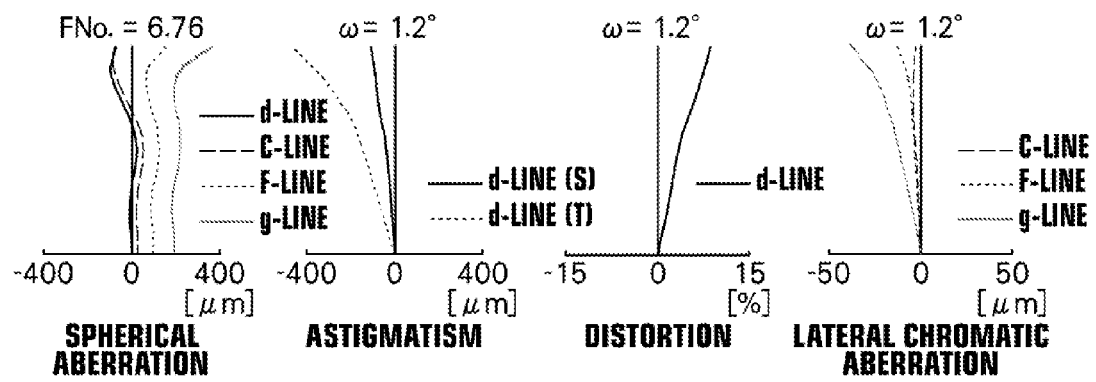

Table 9 shows basic lens data of the zoom lens in Example 3. Table 10 shows data about the specification of the zoom lens in Example 3. Table 11 shows data about moving surface distances. Table 12 shows data about aspheric surface coefficients. FIG. 11, Sections A through L illustrate aberration diagrams.

TABLE 9

EXAMPLE 3 - LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 223.5393 | 1.51 | 1.80440 | 39.60 |
| 2 | 53.9454 | 6.68 | 1.49700 | 81.54 |
| 3 | -186.7839 | 0.10 | | |
| 4 | 50.2252 | 4.80 | 1.59282 | 68.63 |
| 5 | 289.1225 | DD[5] | | |
| 6 | 132.0095 | 0.95 | 1.83481 | 42.71 |
| 7 | 8.2291 | 4.80 | | |
| 8 | -19.1341 | 0.88 | 1.80610 | 40.92 |
| 9 | 56.2574 | 0.10 | | |
| 10 | 20.8053 | 3.46 | 1.92286 | 18.90 |
| 11 | -51.1072 | 0.88 | 1.88300 | 40.76 |
| 12 | 90.3183 | DD[12] | | |
| 13(STOP) | ∞ | 1.50 | | |
| 14 | 8.6339 | 4.81 | 1.48749 | 70.23 |
| 15 | -11.3782 | 0.88 | 1.83400 | 37.16 |
| 16 | -23.7354 | 0.20 | | |
| 17 | 47.7867 | 4.27 | 1.71299 | 53.87 |
| 18 | -11.0001 | 0.88 | 1.79952 | 42.22 |
| 19 | 50.2516 | 0.40 | | |
| *20 | 7.0001 | 2.50 | 1.56864 | 58.62 |
| *21 | 7.3558 | DD[21] | | |
| 22 | 74.9762 | 0.80 | 1.83400 | 37.16 |
| 23 | 7.7289 | 0.60 | | |
| *24 | 8.3679 | 2.20 | 1.53391 | 55.89 |
| *25 | 30.5001 | DD[25] | | |
| *26 | 1086.5832 | 2.70 | 1.53391 | 55.89 |
| *27 | -7.4023 | 1.10 | | |
| 28 | ∞ | 0.80 | 1.51680 | 64.20 |
| 29 | ∞ | 2.75 | | |

TABLE 10

EXAMPLE 3 - SPECIFICATION (d-LINE)

| | WIDE ANGLE | MIDDLE | TELEPHOTO |
|---|---|---|---|
| ZOOM MAGNIFICATION RATIO | 1.0 | 7.5 | 47.1 |
| f | 4.35 | 32.65 | 204.95 |
| FNo. | 3.39 | 5.41 | 6.76 |
| 2ω[°] | 94.8 | 13.2 | 2.4 |

TABLE 11

EXAMPLE 3 - ZOOM DISTANCE

| | WIDE ANGLE | MIDDLE | TELEPHOTO |
|---|---|---|---|
| DD[5] | 0.58 | 47.35 | 74.95 |
| DD[12] | 31.45 | 11.33 | 1.81 |
| DD[21] | 2.62 | 7.36 | 11.36 |
| DD[25] | 3.28 | 15.54 | 18.67 |

TABLE 12

EXAMPLE 3 - ASPHERIC SURFACE COEFFICIENT

| | SURFACE NUMBER | | |
|---|---|---|---|
| | 20 | 21 | 24 |
| KA | 0.0000000E+00 | 0.0000000E+00 | 9.9858849E-01 |
| A3 | 3.5194825E-05 | 2.4877428E-05 | -7.9448771E-04 |
| A4 | -9.1259035E-05 | 2.7370653E-04 | -1.4106330E-04 |
| A5 | -3.4848057E-05 | 9.7021289E-06 | -1.8868792E-04 |
| A6 | -2.8299394E-06 | -1.7770410E-05 | 5.3762494E-06 |

TABLE 12-continued

EXAMPLE 3 - ASPHERIC SURFACE COEFFICIENT

| A7 | −1.6336898E−06 | −4.6460453E−06 | 2.2735299E−05 |
|---|---|---|---|
| A8 | −3.6190710E−07 | −5.2997309E−07 | 4.1530284E−06 |
| A9 | −1.0333655E−07 | −7.6318024E−08 | 1.1800520E−09 |
| A10 | −1.2786129E−08 | −3.4229251E−09 | −4.0983097E−07 |
| A11 | −1.8566621E−09 | 5.0110763E−10 | −8.2334264E−08 |
| A12 | 1.8000150E−10 | 2.3836828E−10 | −2.8331680E−08 |
| A13 | 1.0931229E−10 | 4.4141144E−11 | −3.1637844E−09 |
| A14 | 2.5380661E−11 | 7.0902347E−12 | 3.3690565E−09 |
| A15 | 9.4765495E−12 | 3.2299721E−12 | 1.1375237E−09 |
| A16 | 2.2768029E−13 | 7.2930789E−13 | 2.0965110E−10 |
| A17 | −4.2298985E−13 | 1.4521435E−13 | −1.9468436E−11 |
| A18 | −1.9822796E−13 | 2.5577813E−14 | −5.7315055E−11 |
| A19 | −1.9192457E−14 | −4.5492169E−16 | 1.1707052E−11 |
| A20 | 1.0838208E−14 | −1.5156669E−15 | −8.8917300E−13 |

SURFACE NUMBER

| | 25 | 26 | 27 |
|---|---|---|---|
| KA | −3.4356281E−02 | −1.5919206E−02 | 6.0897382E−01 |
| A3 | −3.7929976E−04 | 3.8177383E−03 | 5.3885518E−03 |
| A4 | −6.9961451E−04 | −1.6572658E−03 | −1.7916006E−03 |
| A5 | 1.0168216E−04 | 5.3459736E−05 | 5.5287290E−04 |
| A6 | 7.3843981E−06 | 7.2602184E−05 | −4.3329082E−05 |
| A7 | −1.6226768E−06 | −4.8974929E−06 | −9.9407611E−06 |
| A8 | 2.0881076E−07 | −1.8692134E−06 | 1.1038055E−06 |
| A9 | 3.1749046E−07 | 1.5162102E−08 | 3.1755849E−07 |
| A10 | 2.7569861E−07 | 5.9534773E−08 | 3.0676327E−08 |
| A11 | 2.8387925E−08 | 9.1638701E−09 | −2.3009594E−09 |
| A12 | 6.0966231E−09 | 5.7322777E−10 | −1.1315956E−09 |
| A13 | −3.9007838E−09 | −2.0838522E−10 | −1.8971726E−10 |
| A14 | −4.4058901E−09 | −7.7327336E−11 | −1.2784100E−11 |
| A15 | −6.7430841E−10 | −1.3480473E−11 | 1.9511726E−12 |
| A16 | 4.6896009E−11 | −2.8760743E−13 | −5.4179089E−14 |
| A17 | −5.3144357E−12 | 3.0669242E−13 | −3.9170140E−14 |
| A18 | 7.7085581E−11 | 1.2921973E−13 | 1.9739940E−14 |
| A19 | −2.4348533E−12 | 1.5038695E−14 | 1.8928268E−14 |
| A20 | −2.8770423E−12 | −4.6753424E−15 | −2.5889239E−15 |

Figure 5:
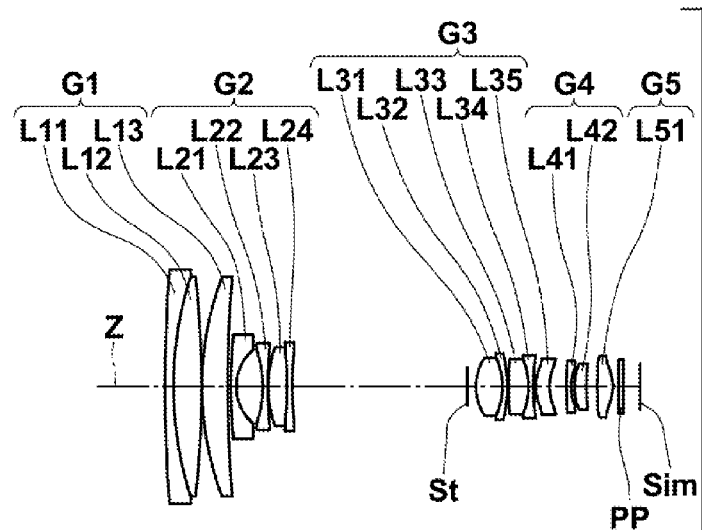
FIG. 5 is a cross section illustrating the lens configuration of a zoom lens in Example 4 of the present invention.
Figure 5:
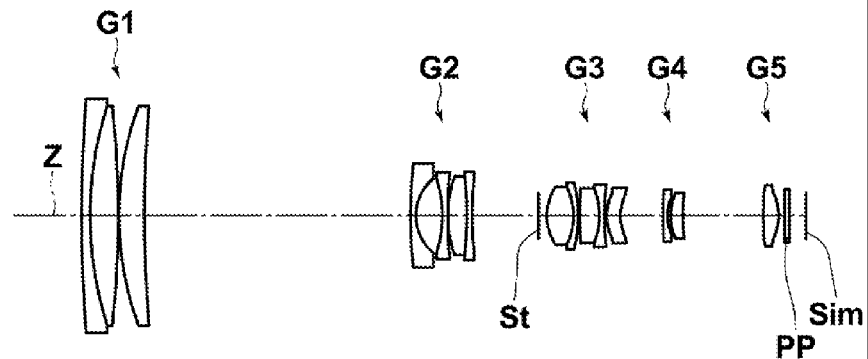
Figure 5:
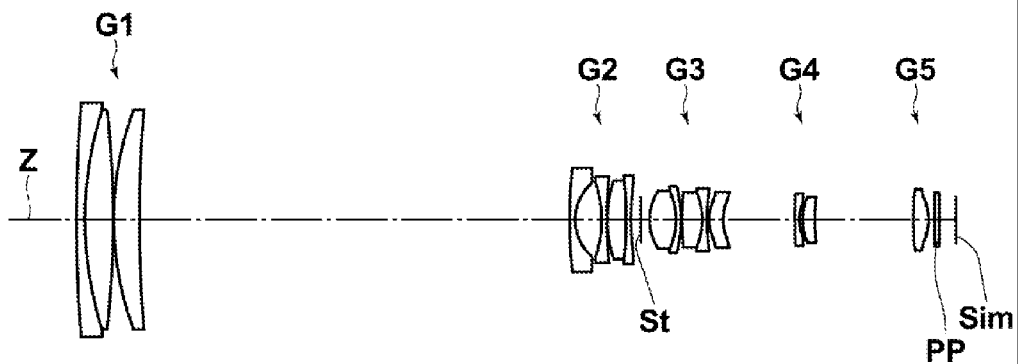

Next, a zoom lens in Example 4 will be described. FIG. 5 is a cross section illustrating the lens configuration of the zoom lens in Example 4.

The shape of the zoom lens in Example 4 is also similar to that of the zoom lens in Example 2.

Figure 12:
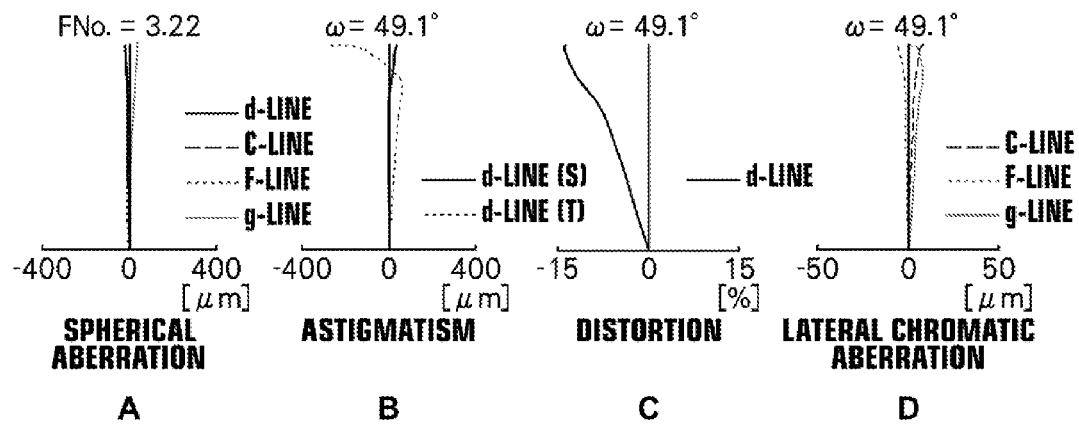
FIG. 12 is aberration diagrams (Sections A through L) of the zoom lens in Example 4 of the present invention.
Figure 12:
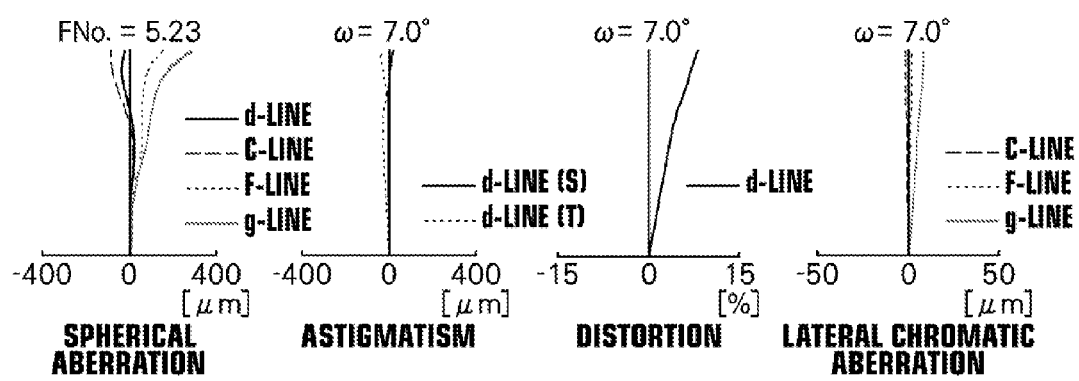
Figure 12:
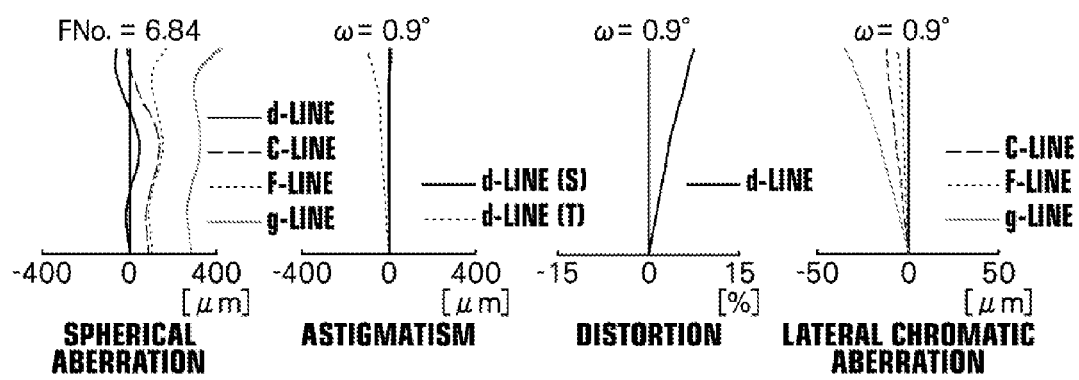

Table 13 shows basic lens data of the zoom lens in Example 4. Table 14 shows data about the specification of the zoom lens in Example 4. Table 15 shows data about moving surface distances. Table 16 shows data about aspheric surface coefficients. FIG. 12, Sections A through L illustrate aberration diagrams.

TABLE 13

EXAMPLE 4 - LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 249.0543 | 1.51 | 1.91082 | 35.25 |
| 2 | 59.7272 | 5.08 | 1.49700 | 81.54 |
| 3 | −157.8441 | 0.10 | | |
| 4 | 52.2327 | 4.60 | 1.71299 | 53.87 |
| 5 | 21.4953 | DD[5] | | |
| 6 | 91.5449 | 0.95 | 1.83481 | 42.71 |
| 7 | 8.1932 | 4.80 | | |
| 8 | −18.9326 | 0.88 | 1.80610 | 40.92 |
| 9 | 59.7288 | 0.10 | | |
| 10 | 20.2111 | 3.41 | 1.94595 | 17.98 |
| 11 | −52.4594 | 0.89 | 1.88300 | 40.76 |
| 12 | 46.7052 | DD[12] | | |
| 13(STOP) | ∞ | 1.50 | | |
| 14 | 8.7009 | 4.81 | 1.49700 | 81.54 |

TABLE 13-continued

EXAMPLE 4 - LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 15 | −11.3086 | 0.88 | 1.83481 | 42.71 |
| 16 | −22.1811 | 0.20 | | |
| 17 | 48.6840 | 3.61 | 1.71299 | 53.87 |
| 18 | −11.6906 | 0.88 | 1.79952 | 42.22 |
| 19 | 40.6208 | 0.40 | | |
| *20 | 7.1108 | 2.50 | 1.56864 | 58.62 |
| *21 | 7.5871 | DD[21] | | |
| 22 | 92.3966 | 0.80 | 1.83400 | 37.16 |
| 23 | 7.8599 | 0.60 | | |
| *24 | 9.0267 | 2.20 | 1.53391 | 55.89 |
| *25 | 31.9656 | DD[25] | | |
| *26 | 825.7211 | 2.70 | 1.53391 | 55.89 |
| *27 | −7.1501 | 1.10 | | |
| 28 | ∞ | 0.80 | 1.51680 | 54.20 |
| 29 | ∞ | 3.04 | | |

TABLE 14

EXAMPLE 4 - SPECIFICATION (d-LINE)

| | WIDE ANGLE | MIDDLE | TELEPHOTO |
|---|---|---|---|
| ZOOM MAGNIFICATION RATIO | 1.0 | 7.5 | 56.0 |
| f | 4.01 | 30.07 | 224.54 |
| FNo. | 3.22 | 5.23 | 6.84 |
| 2ω[°] | 98.2 | 14.0 | 1.8 |

TABLE 15

EXAMPLE 4 - ZOOM DISTANCE

| | WIDE ANGLE | MIDDLE | TELEPHOTO |
|---|---|---|---|
| DD[5] | 0.58 | 48.01 | 77.60 |
| DD[12] | 31.59 | 11.98 | 1.81 |
| DD[21] | 3.07 | 7.66 | 12.93 |
| DD[25] | 2.00 | 14.55 | 17.85 |

TABLE 16

EXAMPLE 4 - ASPHERIC SURFACE COEFFICIENT

SURFACE NUMBER

| | 20 | 21 | 24 |
|---|---|---|---|
| KA | 0.0000000E+00 | 0.0000000E+00 | 9.9858849E−01 |
| A3 | 3.5194825E−05 | 2.4877428E−05 | −7.9448771E−04 |
| A4 | −9.1259035E−05 | 2.7370653E−04 | −1.4106330E−04 |
| A5 | −3.4848057E−05 | 9.7021289E−06 | −1.8868792E−04 |
| A6 | −2.8299394E−06 | −1.7770410E−05 | 5.3762494E−06 |
| A7 | −1.6336898E−06 | −4.6460453E−06 | 2.2735299E−05 |
| A8 | −3.6190710E−07 | −5.2997309E−07 | 4.1530284E−06 |
| A9 | −1.0333655E−07 | −7.6318024E−08 | 1.1800520E−09 |
| A10 | −1.2786129E−08 | −3.4229251E−09 | −4.0983097E−07 |
| A11 | −1.8566621E−09 | 5.0110763E−10 | −8.2334264E−08 |
| A12 | 1.8000150E−10 | 2.3836828E−10 | −2.8331680E−08 |
| A13 | −1.0931229E−10 | 4.4141144E−11 | −3.1637844E−09 |
| A14 | 2.5380661E−11 | 7.0902347E−12 | 3.3690565E−09 |
| A15 | 9.4765495E−12 | 3.2299721E−12 | 1.1375237E−09 |
| A16 | 2.2768029E−13 | 7.2930789E−13 | 2.0965110E−10 |
| A17 | −4.2298985E−13 | 1.4521435E−13 | −1.9468436E−11 |
| A18 | −1.9822796E−13 | 2.5577813E−14 | −5.7315055E−11 |

TABLE 16-continued

EXAMPLE 4 - ASPHERIC SURFACE COEFFICIENT

| | | | |
|---|---|---|---|
| A19 | −1.9192457E−14 | −4.5492169E−16 | 1.1707052E−11 |
| A20 | 1.0838208E−14 | −1.5156669E−15 | −8.8917300E−13 |

| | SURFACE NUMBER | | |
|---|---|---|---|
| | 25 | 26 | 27 |
| KA | −3.4356281E−02 | −1.5919206E−02 | 6.0897382E−01 |
| A3 | −3.7929976E−04 | 3.8177383E−03 | 5.3885518E−03 |
| A4 | −6.9961451E−04 | −1.6572658E−03 | −1.7916006E−03 |
| A5 | 1.0168216E−04 | 5.3459736E−05 | 5.5287290E−04 |
| A6 | 7.3843981E−06 | 7.2602184E−05 | −4.3329062E−05 |
| A7 | −1.6226768E−06 | −4.8974929E−06 | −9.9407611E−06 |
| A8 | 2.0881076E−07 | −1.8692134E−06 | 1.1038055E−06 |
| A9 | 3.1749046E−07 | 1.5162102E−08 | 3.1755849E−07 |
| A10 | 2.7569861E−07 | 5.9534773E−08 | 3.0676327E−08 |
| A11 | 2.8387925E−08 | 9.1638701E−09 | −2.3009594E−09 |
| A12 | 6.0966231E−09 | 5.7322777E−10 | −1.1315956E−09 |
| A13 | −3.9007838E−09 | −2.0838522E−10 | −1.8971726E−10 |
| A14 | −4.4058901E−09 | −7.7327336E−11 | −1.2784100E−11 |
| A15 | −6.7430841E−10 | −1.3480473E−11 | 1.9511726E−12 |
| A16 | 4.6896009E−11 | −2.8760743E−13 | −5.4179089E−14 |
| A17 | −5.3144357E−12 | 3.0692426E−13 | −3.9170140E−14 |
| A18 | 7.7085581E−11 | 1.2921973E−13 | 1.9739940E−14 |
| A19 | −2.4348533E−12 | 1.5038695E−14 | 1.8928268E−14 |
| A20 | −2.8770423E−12 | −4.6753424E−15 | −2.5889239E−15 |

Figure 6:
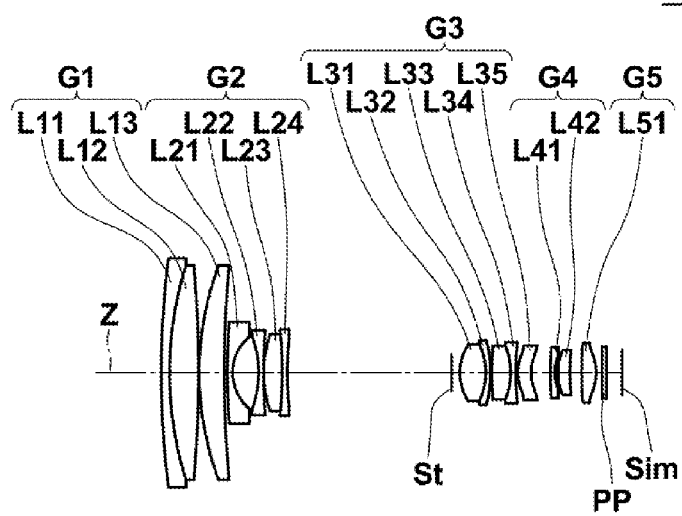
FIG. 6 is a cross section illustrating the lens configuration of a zoom lens in Example 5 of the present invention.
Figure 6:
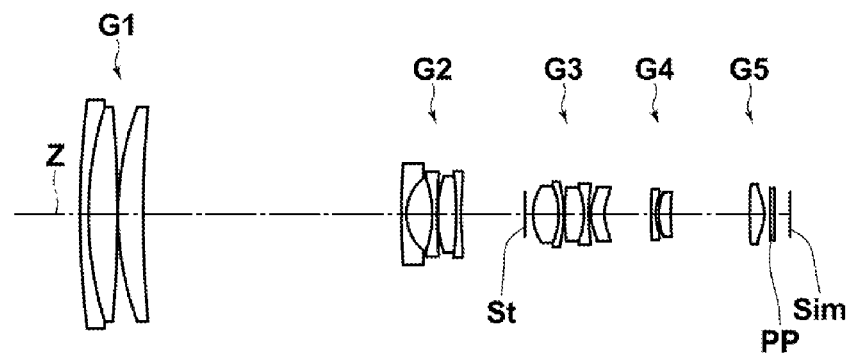
Figure 6:
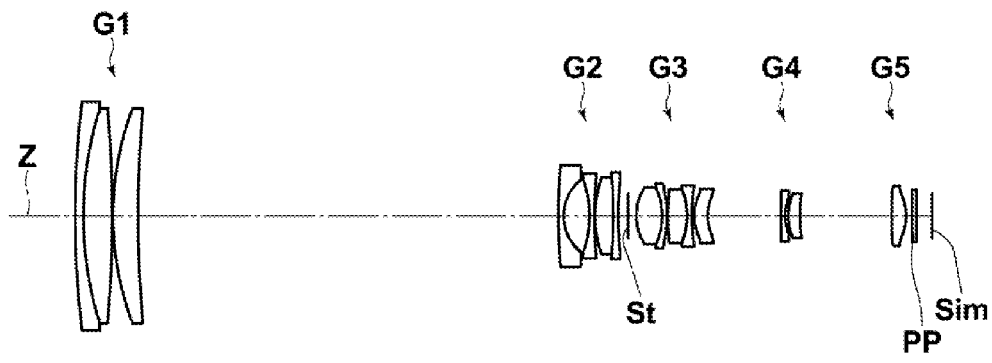

Next, a zoom lens in Example 5 will be described. FIG. 6 is a cross section illustrating the lens configuration of the zoom lens in Example 5.

The shape of the zoom lens in Example 5 is also similar to that of the zoom lens in Example 2.

Figure 13:
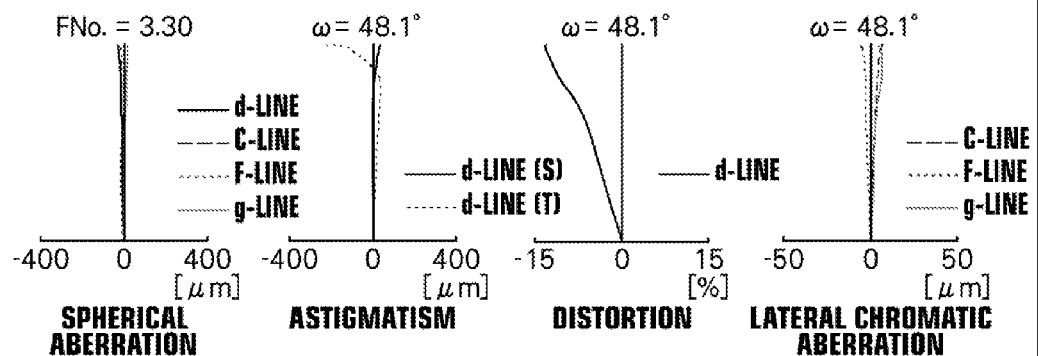
FIG. 13 is aberration diagrams (Sections A through L) of the zoom lens in Example 5 of the present invention.
Figure 13:
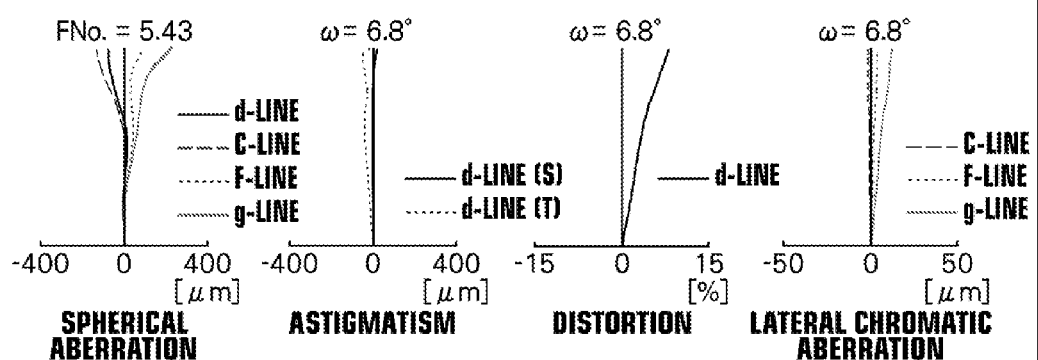
Figure 13:
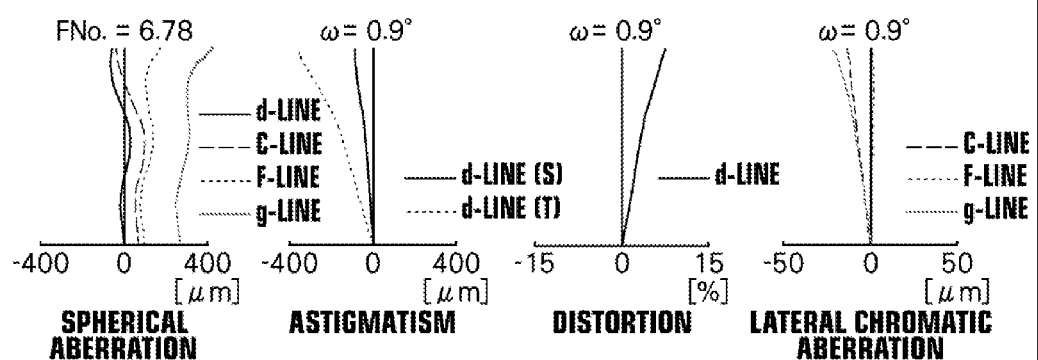

Table 17 shows basic lens data of the zoom lens in Example 5. Table 18 shows data about the specification of the zoom lens in Example 5. Table 19 shows data about moving surface distances. Table 20 shows data about aspheric surface coefficients. FIG. 13, Sections A through L illustrate aberration diagrams.

TABLE 17

EXAMPLE 5 - LENS DATA

| Si (SURFACE NUMBER) | Ri (CURVA- TURE RADIUS) | Di (SURFACE DISTANCE) | Ndj (REFRAC- TIVE INDEX) | vdj (ABBE NUMBER) |
|---|---|---|---|---|
| 1 | 160.2199 | 1.51 | 1.91082 | 35.25 |
| 2 | 61.1364 | 5.37 | 1.49700 | 81.54 |
| 3 | −205.8867 | 0.10 | | |
| 4 | 51.9196 | 4.63 | 1.61800 | 53.33 |
| 5 | 200.3257 | DD[5] | | |
| 6 | 107.0743 | 0.95 | 1.83481 | 42.71 |
| 7 | 8.0242 | 4.80 | | |
| 8 | −18.2149 | 0.88 | 1.90610 | 40.92 |
| 9 | 71.9095 | 0.10 | | |
| 10 | 20.0014 | 3.41 | 1.94595 | 17.98 |
| 11 | −69.0618 | 0.88 | 1.88300 | 40.76 |
| 12 | 46.7003 | DD[12] | | |
| 13(STOP) | ∞ | 1.50 | | |
| 14 | 8.7582 | 4.81 | 1.49700 | 81.54 |
| 15 | −11.5278 | 0.88 | 1.83481 | 42.71 |
| 16 | −21.9949 | 0.20 | | |
| 17 | 50.2452 | 3.54 | 1.71299 | 53.87 |
| 18 | −11.9076 | 0.88 | 1.79952 | 42.22 |
| 19 | 38.6290 | 0.40 | | |
| *20 | 7.1234 | 2.50 | 1.56864 | 58.62 |
| *21 | 7.7253 | DD[21] | | |
| 22 | 80.5396 | 0.80 | 1.83400 | 37.16 |
| 23 | 7.8803 | 0.60 | | |
| *24 | 9.1368 | 2.20 | 1.53391 | 55.89 |
| *25 | 32.4118 | DD[25] | | |
| *26 | 553.2121 | 2.70 | 1.53391 | 55.89 |

TABLE 17-continued

EXAMPLE 5 - LENS DATA

| Si (SURFACE NUMBER) | Ri (CURVA- TURE RADIUS) | Di (SURFACE DISTANCE) | Ndj (REFRAC- TIVE INDEX) | vdj (ABBE NUMBER) |
|---|---|---|---|---|
| *27 | −7.1331 | 1.10 | | |
| 28 | ∞ | 0.80 | 1.51680 | 64.20 |
| 29 | ∞ | 2.91 | | |

TABLE 18

EXAMPLE 5 - SPECIFICATION (d-LINE)

| | WIDE ANGLE | MIDDLE | TELEPHOTO |
|---|---|---|---|
| ZOOM MAGNIFICATION RATIO | 1.0 | 7.5 | 58.8 |
| f′ | 4.12 | 30.91 | 242.33 |
| FNo. | 3.30 | 5.43 | 6.78 |
| 2ω[°] | 95.2 | 13.6 | 1.8 |

TABLE 19

EXAMPLE 5 - ZOOM DISTANCE

| | WIDE ANGLE | MIDDLE | TELEPHOTO |
|---|---|---|---|
| DD[5] | 0.58 | 47.70 | 77.70 |
| DD[12] | 30.39 | 11.82 | 1.80 |
| DD[21] | 3.56 | 8.63 | 13.50 |
| DD[25] | 2.14 | 14.50 | 16.95 |

TABLE 20

EXAMPLE 5 - ASPHERIC SURFACE COEFFICIENT

| | SURFACE NUMBER | | |
|---|---|---|---|
| | 20 | 21 | 24 |
| KA | 0.0000000E+00 | 0.0000000E+00 | 9.9858849E−01 |
| A3 | 3.5194825E−05 | 2.4877428E−05 | −7.9448771E−04 |
| A4 | −9.1259035E−05 | 2.7370653E−04 | −1.4106330E−04 |
| A5 | −3.4848057E−05 | 9.7021289E−06 | −1.8868792E−04 |
| A6 | −2.8299394E−06 | −1.7770410E−05 | 5.3762494E−06 |
| A7 | −1.6336898E−06 | −4.6460453E−06 | 2.2735299E−05 |
| A8 | −3.6190710E−07 | −5.2997309E−07 | 4.1530284E−06 |
| A9 | −1.0333655E−07 | −7.6318024E−08 | 1.1800520E−09 |
| A10 | −1.2786129E−08 | −3.4229251E−09 | −4.0983097E−07 |
| A11 | −1.8566621E−09 | 5.0110763E−10 | −8.2334264E−08 |
| A12 | 1.8000150E−10 | 2.3836828E−10 | −2.8331680E−08 |
| A13 | 1.0931229E−10 | 4.4141144E−11 | −3.1637844E−09 |
| A14 | 2.5380661E−11 | 7.0902347E−12 | 3.3690565E−09 |
| A15 | 9.4765495E−12 | 3.2299721E−12 | 1.1375237E−09 |
| A16 | 2.2768029E−13 | 7.2930789E−13 | 2.0965110E−10 |
| A17 | −4.2298985E−13 | 1.4521435E−13 | −1.9468436E−11 |
| A18 | −1.9822796E−13 | 2.5577813E−14 | −5.7315055E−11 |
| A19 | −1.9192457E−14 | −4.5492169E−16 | 1.1707052E−11 |
| A20 | 1.0838208E−14 | −1.5156669E−15 | −8.8917300E−13 |

| | SURFACE NUMBER | | |
|---|---|---|---|
| | 25 | 26 | 27 |
| KA | −3.4356281E−02 | −1.5919206E−02 | 6.0897382E−01 |
| A3 | −3.7929976E−04 | 3.8177383E−03 | 5.3885518E−03 |
| A4 | −6.9961451E−04 | −1.6572658E−03 | −1.7916006E−03 |
| A5 | 1.0168216E−04 | 5.3459736E−05 | 5.5287290E−04 |
| A6 | 7.3843981E−06 | 7.2602184E−05 | −4.3329082E−05 |
| A7 | −1.6226768E−06 | −4.8974929E−06 | −9.9407611E−06 |
| A8 | 2.0881076E−07 | −1.8692134E−06 | 1.1038055E−06 |

TABLE 20-continued

EXAMPLE 5 - ASPHERIC SURFACE COEFFICIENT

| | | | |
|---|---|---|---|
| A9  | 3.1749046E-07  | 1.5162102E-08  | 3.1755849E-07 |
| A10 | 2.7569861E-07  | 5.9534773E-08  | 3.0676327E-08 |
| A11 | 2.8387925E-08  | 9.1638701E-09  | -2.3009594E-09 |
| A12 | 6.0966231E-09  | 5.7322777E-10  | 1.1315956E-09 |
| A13 | -3.9007838E-09 | -2.0838522E-10 | -1.8971726E-10 |
| A14 | -4.4058901E-09 | -7.7327336E-11 | -1.2784100E-11 |
| A15 | -6.7430841E-10 | -1.3480473E-11 | 1.9511726E-12 |
| A16 | 4.6896009E-11  | -2.8760743E-13 | -5.4179089E-14 |
| A17 | -5.3144357E-12 | 3.0669242E-13  | -3.9170140E-14 |
| A18 | 7.7085581E-11  | 1.2921973E-13  | 1.9739940E-14 |
| A19 | -2.4348533E-12 | 1.5038695E-14  | 1.8928268E-14 |
| A20 | -2.8770423E-12 | -4.6753424E-15 | -2.5889239E-15 |

Figure 7:
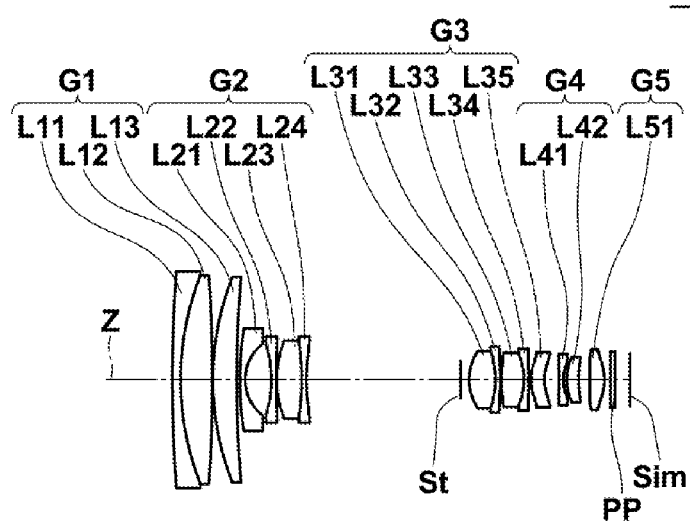
FIG. 7 is a cross section illustrating the lens configuration of a zoom lens in Example 6 of the present invention.
Figure 7:
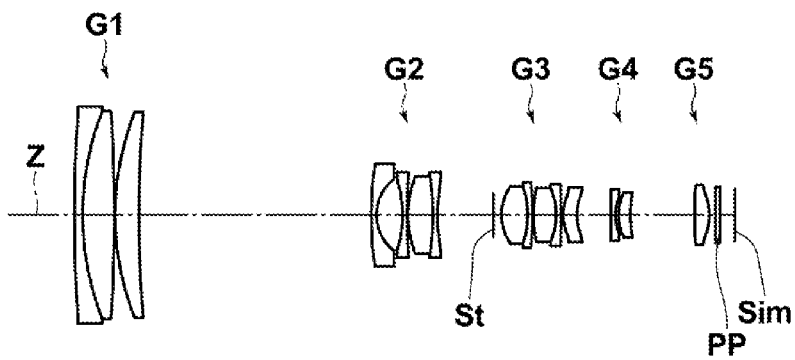
Figure 7:
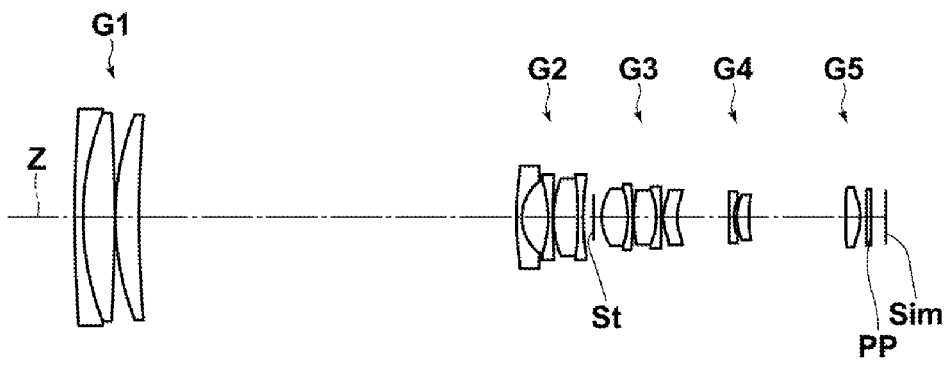

Next, a zoom lens in Example 6 will be described. FIG. 7 is a cross section illustrating the lens configuration of the zoom lens in Example 6.

The shape of the zoom lens in Example 6 is also similar to that of the zoom lens in Example 2.

Figure 14:
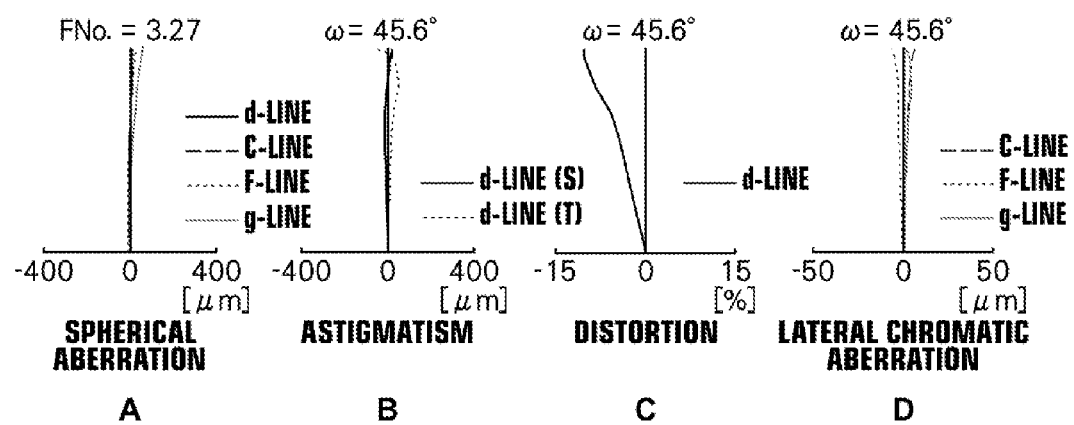
FIG. 14 is aberration diagrams (Sections A through L) of the zoom lens in Example 6 of the present invention.
Figure 14:
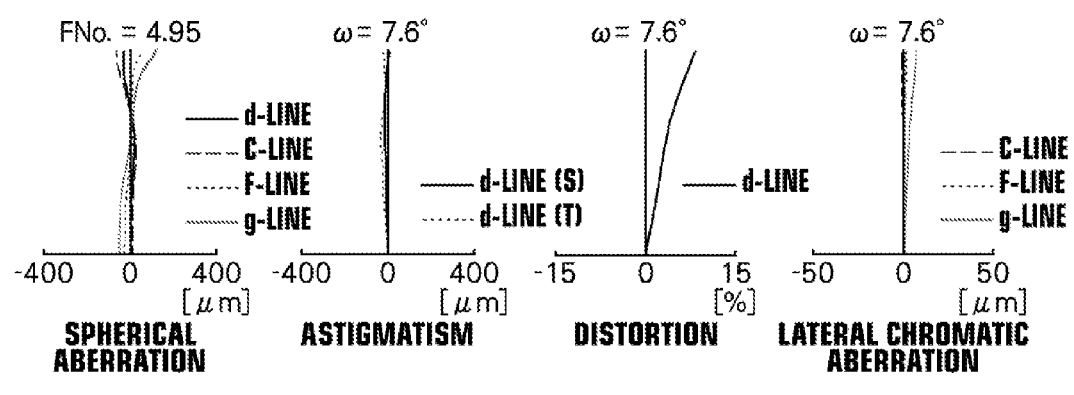
Figure 14:
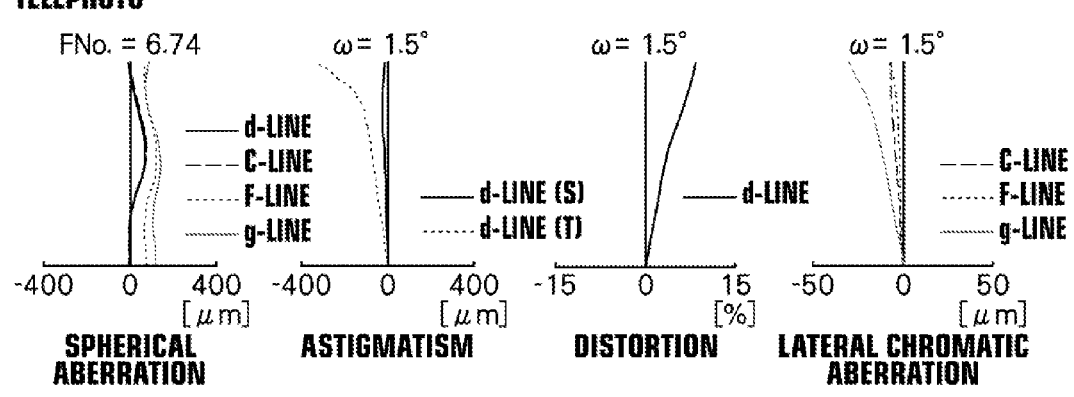

Table 21 shows basic lens data of the zoom lens in Example 6. Table 22 shows data about the specification of the zoom lens in Example 6. Table 23 shows data about moving surface distances. Table 24 shows data about aspheric surface coefficients. FIG. 14, Sections A through L illustrate aberration diagrams.

TABLE 21

EXAMPLE 6 - LENS DATA

| Si (SURFACE NUMBER) | Ri (CURVA- TURE RADIUS) | Di (SURFACE DISTANCE) | Ndj (REFRAC- TIVE INDEX) | νdj (ABBE NUMBER) |
|---|---|---|---|---|
| 1 | 246.6697 | 1.51 | 1.83400 | 37.16 |
| 2 | 47.9587 | 5.80 | 1.59282 | 68.63 |
| 3 | -266.8129 | 0.10 | | |
| 4 | 47.1889 | 4.34 | 1.62041 | 60.29 |
| 5 | 206.4799 | DD[5] | | |
| 6 | 58.0093 | 0.95 | 1.88300 | 40.76 |
| 7 | 7.8001 | 4.80 | | |
| 8 | -19.6543 | 0.88 | 1.80400 | 46.57 |
| 9 | 134.8211 | 0.10 | | |
| 10 | 17.9126 | 4.51 | 1.92286 | 20.88 |
| 11 | -50.6965 | 0.88 | 1.88300 | 40.76 |
| 12 | 35.1919 | DD[12] | | |
| 13(STOP) | ∞ | 1.50 | | |
| 14 | 8.4999 | 4.81 | 1.49700 | 81.54 |
| 15 | -14.5662 | 0.88 | 1.83481 | 42.71 |
| 16 | -58.2230 | 0.20 | | |
| 17 | 24.7619 | 4.13 | 1.62041 | 60.29 |
| 18 | -11.1393 | 0.88 | 1.79952 | 42.22 |
| 19 | -125.6267 | 0.40 | | |
| *20 | 7.6333 | 2.50 | 1.56864 | 58.62 |
| *21 | 8.5109 | DD[21] | | |
| 22 | -238.8755 | 0.80 | 1.83400 | 37.16 |
| 23 | 7.6538 | 0.60 | | |
| *24 | 8.4290 | 2.20 | 1.53391 | 55.89 |
| *25 | 22.6778 | DD[25] | | |
| *26 | -214748.3648 | 2.70 | 1.53391 | 55.89 |
| *27 | -7.3590 | 1.10 | | |
| 28 | ∞ | 0.80 | 1.51680 | 64.20 |
| 29 | ∞ | 2.75 | | |

TABLE 22

EXAMPLE 6 - SPECIFICATION (d-LINE)

| | WIDE ANGLE | MIDDLE | TELEPHOTO |
|---|---|---|---|
| ZOOM MAGNIFICATION RATIO | 1.0 | 6.3 | 36.0 |
| f | 4.45 | 28.04 | 160.30 |

TABLE 22-continued

EXAMPLE 6 - SPECIFICATION (d-LINE)

| | WIDE ANGLE | MIDDLE | TELEPHOTO |
|---|---|---|---|
| FNo. | 3.27 | 4.95 | 6.74 |
| 2ω[°] | 91.2 | 15.2 | 3.0 |

TABLE 23

EXAMPLE 6 - ZOOM DISTANCE

| | WIDE ANGLE | MIDDLE | TELEPHOTO |
|---|---|---|---|
| DD[5]  | 0.58  | 42.42 | 68.88 |
| DD[12] | 28.16 | 10.13 | 1.87 |
| DD[21] | 2.61  | 6.18  | 9.52 |
| DD[25] | 2.00  | 11.71 | 17.66 |

TABLE 24

EXAMPLE 6 - ASPHERIC SURFACE COEFFICIENT

| | SURFACE NUMBER | | |
|---|---|---|---|
| | 20 | 21 | 24 |
| KA  | 0.0000000E+00  | 0.0000000E+00  | 9.9858849E-01 |
| A3  | 3.5194825E-05  | 2.4877428E-05  | -7.9448771E-04 |
| A4  | -9.1259035E-05 | 2.7370653E-04  | -1.4106330E-04 |
| A5  | -3.4848057E-05 | 9.7021289E-06  | -1.8868792E-04 |
| A6  | -2.8299394E-06 | -1.7770410E-05 | 5.3762494E-06 |
| A7  | -1.6336898E-06 | -4.6460453E-06 | 2.2735299E-05 |
| A8  | -3.6190710E-07 | -5.2997309E-07 | 4.1530284E-06 |
| A9  | -1.0333655E-07 | -7.6318024E-08 | 1.1800520E-09 |
| A10 | -1.2786129E-08 | -3.4229251E-09 | -4.0983097E-07 |
| A11 | -1.8566621E-09 | 5.0110763E-10  | -8.2334264E-08 |
| A12 | 1.8000150E-10  | 2.3836828E-10  | -2.8331680E-08 |
| A13 | 1.0931229E-10  | 4.4141144E-11  | -3.1637844E-09 |
| A14 | 2.5380661E-11  | 7.0902347E-12  | 3.3690565E-09 |
| A15 | 9.4765495E-12  | 3.2299721E-12  | 1.1375237E-09 |
| A16 | 2.2768029E-13  | 7.2930789E-13  | 2.0965110E-10 |
| A17 | -4.2298985E-13 | 1.4521435E-13  | -1.9468436E-11 |
| A18 | -1.9822796E-13 | 2.5577813E-14  | -5.7315055E-11 |
| A19 | -1.9192457E-14 | -4.5492169E-16 | 1.1707052E-11 |
| A20 | 1.0838208E-14  | -1.5156669E-15 | -8.8917300E-13 |

| | SURFACE NUMBER | | |
|---|---|---|---|
| | 25 | 26 | 27 |
| KA  | -3.4356281E-02 | -1.5919206E-02 | 6.0897382E-01 |
| A3  | -3.7929976E-04 | 3.8177383E-03  | 5.3885518E-03 |
| A4  | -6.9961451E-04 | -1.6572658E-03 | -1.7916006E-03 |
| A5  | 1.0168216E-04  | 5.3459736E-05  | 5.5287290E-04 |
| A6  | 7.3843981E-06  | 7.2602184E-05  | -4.3329082E-05 |
| A7  | -1.6226768E-06 | -4.8974929E-06 | -9.9407611E-06 |
| A8  | 2.0881076E-07  | -1.8692134E-06 | 1.1038055E-06 |
| A9  | 3.1749046E-07  | 1.5162102E-08  | 3.1755849E-07 |
| A10 | 2.7569861E-07  | 5.9534773E-08  | 3.0676327E-08 |
| A11 | 2.8387925E-08  | 9.1638701E-09  | -2.3009594E-09 |
| A12 | 6.0966231E-09  | 5.7322777E-10  | -1.1315956E-09 |
| A13 | -3.9007838E-09 | -2.0838522E-10 | -1.8971726E-10 |
| A14 | -4.4058901E-09 | -7.7327336E-11 | -1.2784100E-11 |
| A15 | -6.7430841E-10 | -1.3480473E-11 | 1.9511726E-12 |
| A16 | 4.6896009E-11  | -2.8760743E-13 | -5.4179089E-14 |
| A17 | -5.3144357E-12 | 3.0669242E-13  | -3.9170140E-14 |
| A18 | 7.7085581E-11  | 1.2921973E-13  | 1.9739940E-14 |
| A19 | -2.4348533E-12 | 1.5038695E-14  | 1.8928268E-14 |
| A20 | -2.8770423E-12 | -4.6753424E-15 | -2.5889239E-15 |

Figure 8:
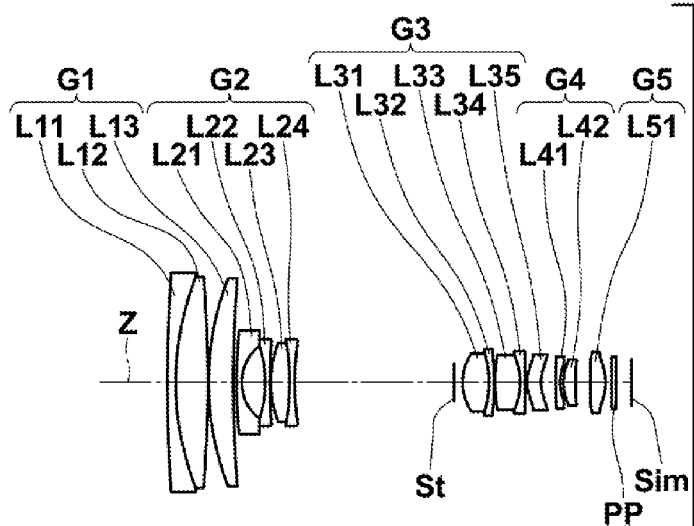
FIG. 8 is a cross section illustrating the lens configuration of a zoom lens in Example 7 of the present invention.
Figure 8:
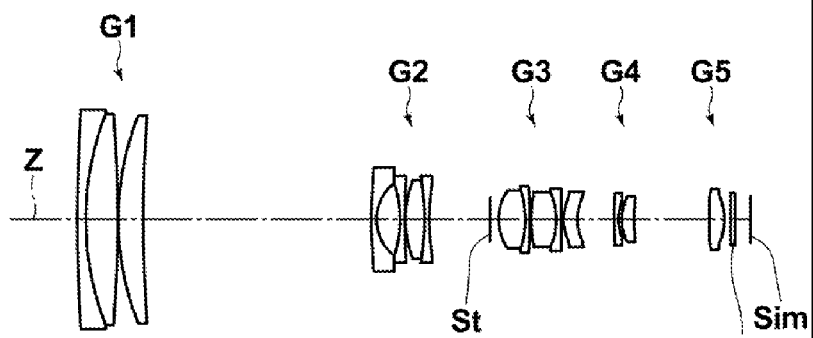
Figure 8:
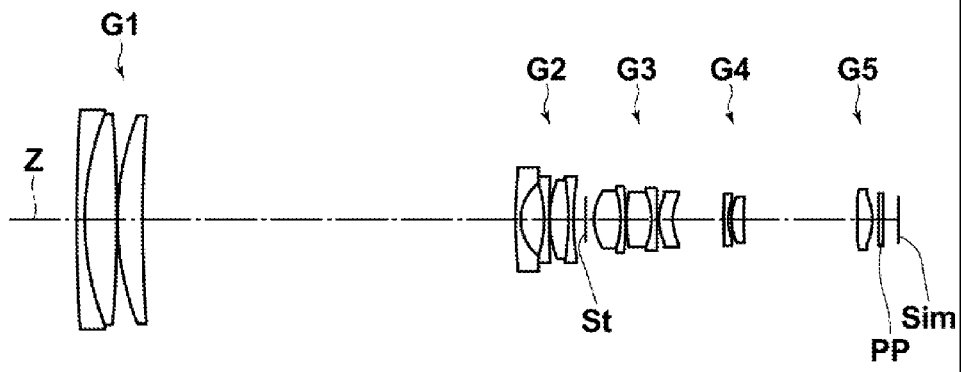

Next, a zoom lens in Example 7 will be described. FIG. 8 is a cross section illustrating the lens configuration of the zoom lens in Example 7.

The shape of the zoom lens in Example 7 is also similar to that of the zoom lens in Example 2.

Figure 15:
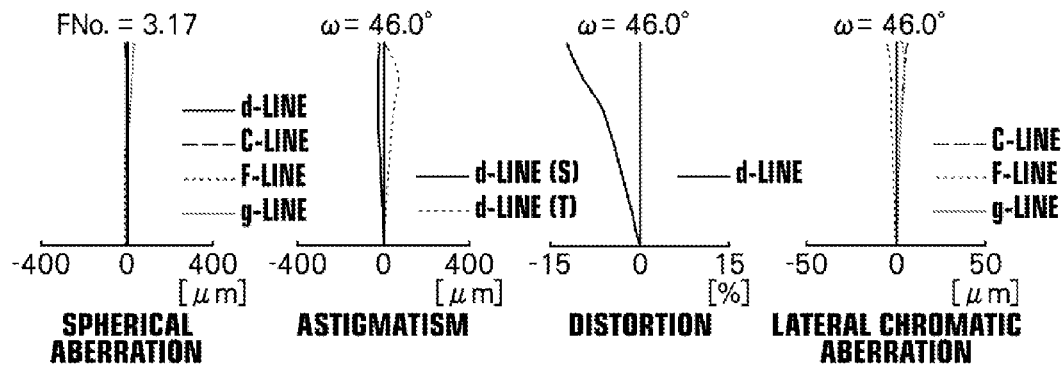
FIG. 15 is aberration diagrams (Sections A through L) of the zoom lens in Example 7 of the present invention.
Figure 15:
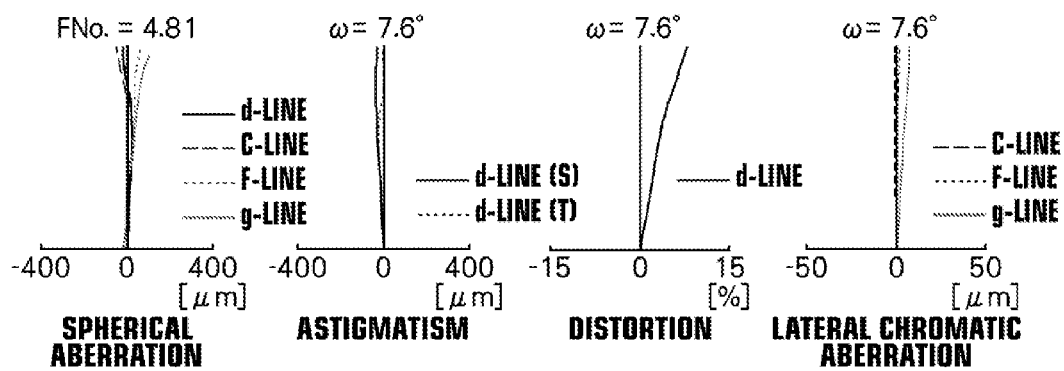
Figure 15:
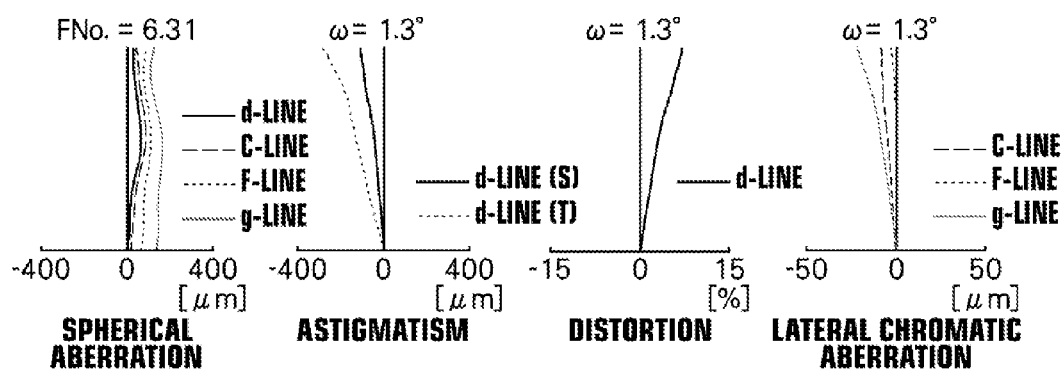

Table 25 shows basic lens data of the zoom lens in Example 7. Table 26 shows data about the specification of the zoom lens in Example 7. Table 27 shows data about moving surface distances. Table 28 shows data about aspheric surface coefficients. FIG. 15, Sections A through L illustrate aberration diagrams.

TABLE 25

EXAMPLE 7 - LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 274.7063 | 1.51 | 1.83400 | 37.16 |
| 2 | 48.1590 | 5.78 | 1.59282 | 68.53 |
| 3 | −218.7696 | 0.10 | | |
| 4 | 47.0606 | 4.48 | 1.62041 | 50.29 |
| 5 | 228.8206 | DD[5] | | |
| 6 | 85.9908 | 0.95 | 1.88300 | 40.76 |
| 7 | 7.8070 | 4.23 | | |
| 8 | −19.6274 | 0.88 | 1.80400 | 46.57 |
| 9 | 128.3130 | 0.10 | | |
| 10 | 17.7710 | 3.41 | 1.92286 | 20.88 |
| 11 | −41.2907 | 0.88 | 1.88300 | 40.76 |
| 12 | 41.3492 | DD[12] | | |
| 13(STOP) | ∞ | 1.50 | | |
| 14 | 8.6331 | 4.81 | 1.49700 | 81.54 |
| 15 | −15.5307 | 0.88 | 1.83481 | 42.71 |
| 16 | −55.4075 | 0.20 | | |
| 17 | 29.1428 | 4.51 | 1.62041 | 60.29 |
| 18 | −11.0001 | 0.88 | 1.79952 | 42.22 |
| 19 | −1311.5652 | 0.40 | | |
| *20 | 7.3531 | 2.50 | 1.55864 | 58.62 |
| *21 | 7.7778 | DD[21] | | |
| 22 | 95.1774 | 0.80 | 1.83400 | 37.16 |
| 23 | 81.399 | 0.60 | | |
| *24 | 8.4016 | 2.20 | 1.53391 | 55.89 |
| *25 | 38.9216 | DD[25] | | |
| *26 | 2594.2187 | 2.70 | 1.53391 | 55.89 |
| *27 | −7.5011 | 1.10 | | |
| 28 | ∞ | 0.80 | 1.51680 | 64.20 |
| 29 | ∞ | 2.75 | | |

TABLE 26

EXAMPLE 7 - SPECIFICATION (d-LINE)

| | WIDE ANGLE | MIDDLE | TELEPHOTO |
|---|---|---|---|
| ZOOM MAGNIFICATION RATIO | 1.0 | 6.3 | 38.5 |
| f' | 4.40 | 27.70 | 169.35 |
| FNo. | 3.17 | 4.81 | 6.31 |
| 2ω[°] | 92.0 | 15.2 | 2.6 |

TABLE 27

EXAMPLE 7 - ZOOM DISTANCE

| | WIDE ANGLE | MIDDLE | TELEPHOTO |
|---|---|---|---|
| DD[5] | 0.58 | 41.13 | 67.24 |
| DD[12] | 28.75 | 10.98 | 2.20 |
| DD[21] | 2.61 | 6.52 | 9.16 |
| DD[25] | 2.69 | 13.62 | 20.59 |

TABLE 28

EXAMPLE 7 - ASPHERIC SURFACE COEFFICIENT

| | SURFACE NUMBER | | |
|---|---|---|---|
| | 20 | 21 | 24 |
| KA | 0.0000000E+00 | 0.0000000E+00 | 9.9858849E−01 |
| A3 | 3.5194825E−05 | 2.4877428E−05 | −7.9448771E−04 |
| A4 | −9.1259035E−05 | 2.7370653E−04 | −1.4106330E−04 |
| A5 | −3.4848057E−05 | 9.7021289E−06 | −1.8868792E−04 |
| A6 | −2.8299394E−06 | −1.7770410E−05 | 5.3762494E−06 |
| A7 | −1.6336898E−06 | −4.6460453E−06 | 2.2735299E−05 |
| A8 | −3.6190710E−07 | −5.2997309E−07 | 4.1530284E−06 |
| A9 | −1.0333655E−07 | −7.6318024E−08 | 1.1800520E−09 |
| A10 | −1.2786129E−08 | −3.4229251E−09 | −4.0983097E−07 |
| A11 | −1.8566621E−09 | 5.0110763E−10 | −8.2334264E−08 |
| A12 | 1.8000150E−10 | 2.3836828E−10 | −2.8331680E−08 |
| A13 | 1.0931229E−10 | 4.4141144E−11 | −3.1637844E−08 |
| A14 | 2.5380661E−11 | 7.0902347E−12 | 3.3690565E−09 |
| A15 | 9.4765495E−12 | 3.2299721E−12 | 1.1375237E−09 |
| A16 | 2.2768029E−13 | 7.2930789E−13 | 2.0965110E−10 |
| A17 | −4.2298985E−13 | 1.4521435E−13 | −1.9468436E−11 |
| A18 | −1.9822796E−13 | 2.5577813E−14 | −5.7315055E−11 |
| A19 | −1.9192457E−14 | −4.5492169E−16 | 1.1707052E−11 |
| A20 | 1.0838208E−14 | −1.5156669E−15 | −8.8917300E−13 |

| | SURFACE NUMBER | | |
|---|---|---|---|
| | 25 | 26 | 27 |
| KA | −3.4356281E−02 | −1.5919206E−02 | 6.0897382E−01 |
| A3 | −3.7929976E−04 | 3.8177383E−03 | 5.3885518E−03 |
| A4 | −6.9961451E−04 | −1.6572658E−03 | −1.7916006E−03 |
| A5 | 1.0168216E−04 | 5.3459736E−05 | 5.5287290E−04 |
| A6 | 7.3843981E−06 | 7.2602184E−05 | −4.3329082E−05 |
| A7 | −1.6226768E−06 | −4.8974929E−06 | −9.9407611E−06 |
| A8 | 2.0881076E−07 | −1.8692134E−06 | 1.1038055E−06 |
| A9 | 3.1749046E−07 | 1.5162102E−08 | 3.1755849E−07 |
| A10 | 2.7569861E−07 | 5.9534773E−08 | 3.0676327E−08 |
| A11 | 2.8387925E−08 | 9.1638701E−09 | −2.3009594E−09 |
| A12 | 6.0966231E−09 | 5.7322777E−10 | −1.1315956E−09 |
| A13 | −3.9007838E−09 | −2.0838522E−10 | −1.8971726E−10 |
| A14 | −4.4058901E−09 | −7.7327336E−11 | −1.2784100E−11 |
| A15 | −6.7430841E−10 | −1.3480473E−11 | 1.9511726E−12 |
| A16 | 4.6896009E−11 | −2.8760743E−13 | −5.4179089E−14 |
| A17 | −5.3144357E−12 | 3.0669242E−13 | −3.9170140E−14 |
| A18 | 7.7085581E−11 | 1.2921973E−13 | 1.9739940E−14 |
| A19 | −2.4348533E−12 | 1.5038695E−14 | 1.8928268E−14 |
| A20 | −2.8770423E−12 | −4.6753424E−15 | −2.5889239E−15 |

Table 29 shows values corresponding to conditional expressions (1) through (10) for the zoom lenses in Examples 1 through 7. In all of the examples, d-line is a reference wavelength. The following Table 29 shows values at this reference wavelength.

TABLE 29

| EXPRESSION NUMBER | CONDITIONAL EXPRESSION | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| (1) | Nd11 | 1.834 | 1.904 | 1.804 | 1.911 | 1.911 | 1.834 | 1.834 |
| (2) | vd11 | 37.16 | 31.32 | 39.60 | 35.25 | 35.25 | 37.16 | 37.16 |
| (3) | vd12 | 70.23 | 81.54 | 81.54 | 81.54 | 81.54 | 68.63 | 68.63 |
| (4) | \|f2\|/ft | 0.0397 | 0.0392 | 0.0389 | 0.0341 | 0.0303 | 0.0481 | 0.0468 |
| (5) | vd2p | 17.98 | 20.88 | 18.90 | 17.98 | 17.98 | 20.88 | 20.88 |
| (6) | vd13 | 60.64 | 68.63 | 68.63 | 53.87 | 63.33 | 60.29 | 60.29 |
| (7) | vd3pc | 81.54 | 81.54 | 70.23 | 81.54 | 81.54 | 81.54 | 81.54 |
| (8) | f1/\|f2\| | 11.296 | 12.657 | 11.965 | 12.731 | 13.239 | 11.911 | 11.092 |
| (9) | \|f4\|/(fw × ft)$^{1/2}$ | 0.607 | 0.710 | 0.694 | 0.632 | 0.613 | 0.523 | 0.885 |
| (10) | f5/\|f4\| | 0.737 | 0.666 | 0.665 | 0.701 | 0.682 | 0.987 | 0.580 |

As these data show, all of the zoom lenses in Examples 1 through 7 satisfy conditional expressions (1) through (10). It is recognizable that the size of the zoom lenses is small, and various aberrations are excellently corrected while the zoom lenses have high variable magnification ratios.

Figure 16:
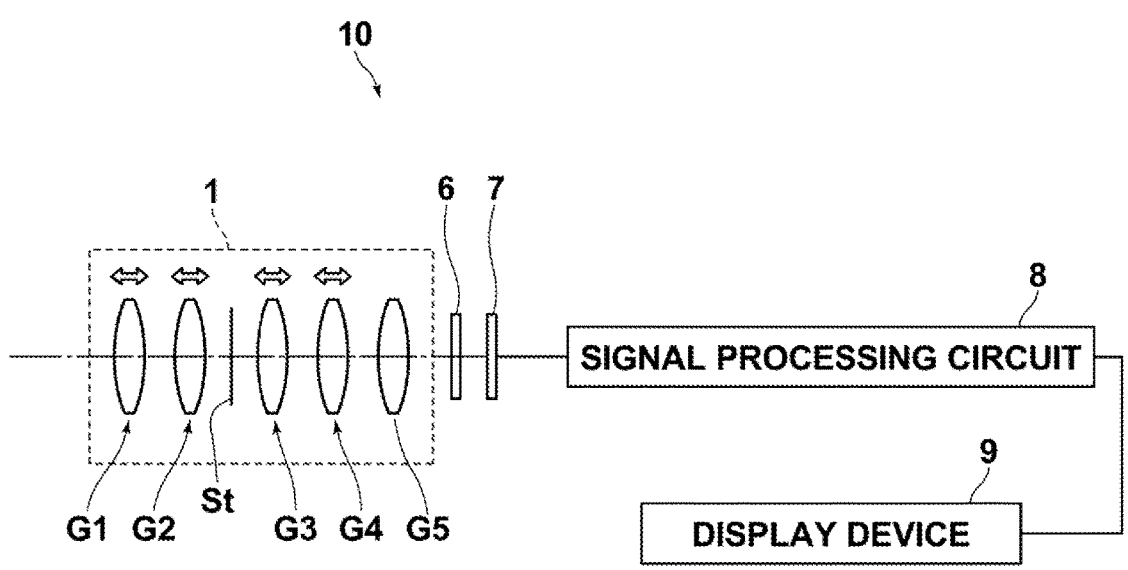
FIG. 16 is a schematic diagram illustrating the configuration of an imaging apparatus according to an embodiment of the present invention.

Next, an imaging apparatus according to an embodiment of the present invention will be described. FIG. 16 is a schematic diagram illustrating the configuration of an imaging apparatus using a zoom lens according to an embodiment of the present invention, as an example of an imaging apparatus according to an embodiment of the present invention. In FIG. 16, each lens group is schematically illustrated. This imaging apparatus is, for example, a video camera, an electronic still camera or the like using a solid state imaging device, such as a CCD and a CMOS, as a recording medium.

An imaging apparatus 10 illustrated in FIG. 16 includes a zoom lens 1, a filter 6 having a function of a low-pass filter or the like, and which is arranged toward the image side of the zoom lens 1, an imaging device 7 arranged toward the image side of the filter 6, and a signal processing circuit 8. The imaging device 7 converts an optical image formed by the zoom lens 1 into electrical signals. For example, a CCD (Charge Coupled Device), a CMOS (Complementary Metal Oxide Semiconductor) or the like may be used as the imaging device 7. The imaging device 7 is arranged in such a manner that an imaging surface of the imaging device 7 is matched with the image plane of the zoom lens 1.

An image imaged by the zoom lens 1 is formed on the imaging surface of the imaging device 7, and signals about the image are output from the imaging device 7. Operation processing is performed on the output signals at a signal processing circuit 8, and an image is displayed on a display device 9.

So far, the present invention has been described by using embodiments and examples. However, the present invention is not limited to the aforementioned embodiments nor examples, and various modifications are possible. For example, the values of a curvature radius, a distance between surfaces, a refractive index, an Abbe number and the like of each lens element are not limited to the values in the aforementioned numerical value examples, and may be other values.

What is claimed is:

1. A zoom lens consisting of:
a first lens group having positive refractive power;
a second lens group having negative refractive power;
a third lens group having positive refractive power;
a fourth lens group having negative refractive power; and
a fifth lens group having positive refractive power in this order from an object side,
wherein distances between the lens groups change during magnification change, and the first lens group is positioned closer to the object side in a telephoto end state than its position in a wide angle end state, and
wherein the first lens group consists of three lenses of an 11th lens having negative refractive power, a 12th lens having positive refractive power and a 13th lens having positive refractive power in this order from the object side, and
wherein the following conditional expressions are satisfied:

$$1.75 < Nd11 \tag{1}$$

$$28 < vd11 < 44 \tag{2}$$

$$63 < vd12 \tag{3}$$

$$0.020 < |f2|/ft < 0.050 \tag{4}$$ and $$8.5 < f1/|f2| < 16.0 \tag{8}$$ where

Nd11: a refractive index of the 11-th lens for d-line,
vd11: an Abbe number of the 11-th lens for d-line,
vd12: an Abbe number of the 12-th lens for d-line,
f2: a focal length of the second lens group,
ft: a focal length of an entire system at a telephoto end, and
f1: a focal length of the first lens group.

2. The zoom lens, as defined in claim 1, wherein the second lens group includes at least one positive lens, and wherein the following conditional expression is satisfied:

$$15 < vd2p < 23 \tag{5}$$ where vd2p: an Abbe number of the at least one positive lens in the second lens group for d-line.

3. The zoom lens, as defined in claim 1, wherein the following conditional expression is satisfied:

$$50 < vd13 < 75 \tag{6}$$ where vd13: an Abbe number of the 13th lens.

4. The zoom lens, as defined in claim 1, wherein the third lens group includes at least one cemented lens including a positive lens, and wherein the following conditional expression is satisfied:

$$65 < vd3pc \tag{7}$$ where vd3pc: an Abbe number of the positive lens constituting the at least one cemented lens for d-line.

5. The zoom lens, as defined in claim 1, wherein the following conditional expression is satisfied:

$$0.3 < |f4|/(fw \times ft)^{1/2} < 1.4 \tag{9}$$ where f4: a focal length of the fourth lens group, and
fw: a focal length of an entire system at a wide angle end.

6. The zoom lens, as defined in claim 1, wherein the following conditional expression is satisfied:

$$0.3 < f5/|f4| < 1.5 \qquad (10),\text{ where}$$

f5: a focal length of the fifth lens group, and
f4: a focal length of the fourth lens group.

7. The zoom lens, as defined in claim 1, wherein at least the first lens group, the second lens group, the third lens group and the fourth lens group move in such a manner that a distance between the first lens group and the second lens group increases, and a distance between the second lens group and the third lens group decreases, and a distance between the third lens group and the fourth lens group increases and a distance between the fourth lens group and the fifth lens group increases in the telephoto end state than their distances in the wide angle end state, respectively.

8. The zoom lens, as defined in claim 1, wherein the second lens group consists of four lenses of a negative lens, a negative lens, and a cemented lens of a positive lens and a negative lens in this order from the object side.

9. The zoom lens, as defined in claim 1, wherein the third lens group includes at least two positive lenses and at least two negative lenses.

10. The zoom lens, as defined in claim 1, wherein the fifth lens group consists of one lens.

11. The zoom lens, as defined in claim 1, wherein the fifth lens group is always fixed.

12. The zoom lens, as defined in claim 1, wherein the fourth lens group consists of two lenses of a positive lens and a negative lens.

13. The zoom lens, as defined in claim 1, wherein focusing is performed by moving the fourth lens group.

14. The zoom lens, as defined in claim 1, wherein the following conditional expressions are satisfied:

$$1.78 < Nd11 \qquad (1\text{-}1);$$

$$30 < vd11 < 42 \qquad (2\text{-}2);$$

$$66 < vd12 < 85 \qquad (3\text{-}1);\text{ and}$$

$$0.027 < |f2|/ft < 0.050 \qquad (4\text{-}2).$$

15. The zoom lens, as defined in claim 1, wherein the second lens group includes at least one positive lens, and
wherein the following conditional expression is satisfied:

$$16 < vd2p < 22 \qquad (5\text{-}1),\text{ where}$$

vd2p: an Abbe number of the at least one positive lens in the second lens group.

16. The zoom lens, as defined in claim 1, wherein the following conditional expression is satisfied:

$$52 < vd13 < 72 \qquad (6\text{-}1),\text{ where}$$

vd13: an Abbe number of the 13-th lens.

17. The zoom lens, as defined in claim 1, wherein the third lens group includes at least one cemented lens including a positive lens, and
wherein the following conditional expression is satisfied:

$$80 < vd3pc \qquad (7\text{-}2),\text{ where}$$

vd3pc: an Abbe number of the positive lens constituting the at least one cemented lens.

18. The zoom lens, as defined in claim 1, wherein the following conditional expression is satisfied:

$$10.0 < f1/|f2| < 14.0 \qquad (8\text{-}2),\text{ where}$$

f1: a focal length of the first lens group.

19. The zoom lens, as defined in claim 1, wherein the following conditional expression is satisfied:

$$0.5 < |f4|/(fw \times ft)1/2 < 1.1 \qquad (9\text{-}2),\text{ where}$$

f4: a focal length of the fourth lens group, and
fw: a focal length of an entire system at a wide angle end.

20. An imaging apparatus, comprising the zoom lens as defined in claim 1.

* * * * *